(12) United States Patent
Rebeschi et al.

(10) Patent No.: US 10,019,119 B2
(45) Date of Patent: Jul. 10, 2018

(54) TOUCH SENSITIVE DEVICE WITH STYLUS SUPPORT

(75) Inventors: Thomas J. Rebeschi, Merrimack, NH (US); Billy L. Weaver, Eagan, MN (US); Brock A. Hable, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1379 days.

(21) Appl. No.: 12/878,612

(22) Filed: Sep. 9, 2010

(65) Prior Publication Data

US 2012/0062497 A1    Mar. 15, 2012

(51) Int. Cl.
| | |
|---|---|
| G06F 3/033 | (2013.01) |
| G06F 3/045 | (2006.01) |
| G06F 3/044 | (2006.01) |
| G06F 3/0354 | (2013.01) |

(52) U.S. Cl.
CPC .......... *G06F 3/044* (2013.01); *G06F 3/03545* (2013.01); *G06F 2203/04106* (2013.01)

(58) Field of Classification Search
CPC ............. G06F 3/03545; G06F 3/04883; G06F 3/0317; G06F 1/1626; G06K 9/222
USPC ........................................ 345/174; 178/18.06
See application file for complete search history.

(56) References Cited

U.S. PATENT DOCUMENTS

| | | | |
|---|---|---|---|
| 3,732,369 A | 5/1973 | Cotter | |
| 3,958,234 A | 5/1976 | Hoo | |
| 3,959,585 A | 5/1976 | Mattes et al. | |
| 3,967,267 A | 6/1976 | Ngo | |
| 3,974,332 A | 8/1976 | Abe et al. | |
| 3,992,579 A | 11/1976 | Dym et al. | |
| 3,999,012 A | 12/1976 | Dym | |
| 4,009,338 A | 2/1977 | Dym et al. | |
| 4,034,155 A | 7/1977 | Muller et al. | |
| 4,071,691 A | 1/1978 | Pepper, Jr. | |
| 4,087,625 A | 5/1978 | Dym et al. | |
| 4,129,858 A | 12/1978 | Hara | |

(Continued)

FOREIGN PATENT DOCUMENTS

| | | |
|---|---|---|
| EP | 178157 | 4/1986 |
| FR | 2774497 | 8/1999 |

(Continued)

OTHER PUBLICATIONS

International Search Report Form PCT/ISA/210; International Application No. PCT/US2011/048174, International Filing Date Aug. 18, 2011, 3 pages.

(Continued)

*Primary Examiner* — Kent Chang
*Assistant Examiner* — Benjamin Morales Fernande
(74) *Attorney, Agent, or Firm* — Clifton F. Richardson; Steven A. Bern

(57) ABSTRACT

A touch-sensitive device with stylus includes a touch panel, a stylus drive unit, a stylus sense unit, a touch panel drive unit, and a measurement unit. A touch by a stylus proximate to a touch panel electrode changes a capacitive coupling between the touch panel electrode and a stylus electrode. The amplitude of the response signal is responsive to the capacitive coupling between the touch panel electrode and the stylus electrode, and is measured to provide an indication of the position of the stylus electrode relative to the touch panel.

19 Claims, 16 Drawing Sheets

(56) References Cited

U.S. PATENT DOCUMENTS

| | | | |
|---|---|---|---|
| 4,158,747 A | 6/1979 | Muller et al. | |
| 4,175,239 A | 11/1979 | Sandler | |
| 4,281,313 A | 7/1981 | Boldridge, Jr. | |
| 4,323,829 A | 4/1982 | Witney et al. | |
| 4,345,239 A | 8/1982 | Elliott | |
| 4,520,357 A | 5/1985 | Castleberry et al. | |
| 4,581,483 A | 4/1986 | Ralston | |
| 4,639,720 A | 1/1987 | Rympalski et al. | |
| 4,659,874 A | 4/1987 | Landmeier | |
| 4,672,154 A | 6/1987 | Rodgers et al. | |
| 4,686,332 A | 8/1987 | Creanias et al. | |
| 4,695,680 A | 9/1987 | Kable | |
| 4,786,765 A | 11/1988 | Yamanami et al. | |
| 4,788,386 A | 11/1988 | Matthews et al. | |
| 4,853,498 A | 8/1989 | Meadows et al. | |
| 5,006,952 A | 4/1991 | Thomas | |
| 5,189,417 A | 2/1993 | Caldwell et al. | |
| RE34,187 E | 3/1993 | Yamanami et al. | |
| 5,305,017 A | 4/1994 | Gerpheide | |
| 5,349,353 A | 9/1994 | Zrilic | |
| 5,365,461 A | 11/1994 | Stein et al. | |
| 5,374,787 A | 12/1994 | Miller et al. | |
| 5,386,219 A | 1/1995 | Greanias et al. | |
| 5,410,329 A * | 4/1995 | Tagawa et al. | 345/104 |
| 5,444,192 A | 8/1995 | Shetye et al. | |
| 5,457,434 A | 10/1995 | Partow | |
| 5,485,177 A | 1/1996 | Shannon et al. | |
| 5,488,204 A | 1/1996 | Mead et al. | |
| 5,526,294 A | 6/1996 | Ono | |
| 5,528,002 A | 6/1996 | Katabami | |
| 5,557,076 A | 9/1996 | Wieczorek et al. | |
| 5,572,205 A | 11/1996 | Caldwell et al. | |
| 5,610,629 A | 3/1997 | Baur | |
| 5,627,349 A | 5/1997 | Shetye et al. | |
| 5,698,822 A | 12/1997 | Haneda et al. | |
| 5,730,165 A | 3/1998 | Philipp | |
| 5,777,607 A | 7/1998 | Koolen | |
| 5,790,106 A | 8/1998 | Hirano et al. | |
| 5,790,107 A | 8/1998 | Kasser | |
| 5,825,352 A | 10/1998 | Bisset et al. | |
| 5,838,308 A | 11/1998 | Knapp et al. | |
| 5,861,583 A | 1/1999 | Schediwy et al. | |
| 5,867,111 A | 2/1999 | Caldwell et al. | |
| 5,877,459 A | 3/1999 | Prater | |
| 5,905,489 A | 5/1999 | Takahama et al. | |
| 5,914,708 A | 6/1999 | Lagrange et al. | |
| 5,920,309 A | 7/1999 | Bisset et al. | |
| 5,923,320 A * | 7/1999 | Murakami et al. | 345/179 |
| 5,990,170 A | 11/1999 | Oora et al. | |
| 6,002,389 A | 12/1999 | Kasser | |
| 6,075,520 A | 6/2000 | Inoue et al. | |
| 6,100,875 A | 8/2000 | Tanaka | |
| 6,175,773 B1 * | 1/2001 | Reiffel et al. | 700/56 |
| 6,239,389 B1 | 5/2001 | Allen et al. | |
| 6,278,068 B1 | 8/2001 | Kuroodi | |
| 6,452,514 B1 | 9/2002 | Philipp | |
| 6,466,036 B1 | 10/2002 | Philipp | |
| 6,535,200 B2 | 3/2003 | Philipp | |
| 6,535,203 B2 | 3/2003 | Shigetaka et al. | |
| 6,727,439 B2 | 4/2004 | Chao et al. | |
| 6,816,153 B2 | 11/2004 | Yamada et al. | |
| 6,879,930 B2 | 4/2005 | Sinclair | |
| 6,885,365 B1 | 4/2005 | Kang | |
| 6,888,536 B2 | 5/2005 | Westerman | |
| 6,970,160 B2 | 11/2005 | Mulligan et al. | |
| 7,129,714 B2 | 10/2006 | Baxter | |
| 7,148,704 B2 | 12/2006 | Philipp | |
| 7,265,746 B2 | 9/2007 | Knowles | |
| 7,274,353 B2 | 9/2007 | Chiu et al. | |
| 7,292,229 B2 | 11/2007 | Morag et al. | |
| 7,444,159 B2 | 11/2008 | Fleming et al. | |
| 7,453,444 B2 | 11/2008 | Geaghan | |
| 7,612,767 B1 | 11/2009 | Griffin et al. | |
| 7,719,515 B2 | 5/2010 | Fujiwara | |
| 7,830,157 B2 | 11/2010 | Geaghan | |
| 8,077,161 B2 | 12/2011 | Kinoshita | |
| 8,094,133 B2 | 1/2012 | Sato | |
| 2001/0006369 A1 | 7/2001 | Ely | |
| 2003/0076306 A1 | 4/2003 | Zadesky et al. | |
| 2003/0122432 A1 | 7/2003 | Caldwell | |
| 2003/0141119 A1 | 7/2003 | Chao et al. | |
| 2003/0197691 A1 | 10/2003 | Fujiwara et al. | |
| 2004/0004488 A1 | 1/2004 | Baxter | |
| 2004/0119701 A1 | 6/2004 | Mulligan et al. | |
| 2004/0178997 A1 | 9/2004 | Gillespie et al. | |
| 2005/0150697 A1 | 7/2005 | Altman et al. | |
| 2005/0156912 A1 | 7/2005 | Taylor et al. | |
| 2005/0162411 A1 | 7/2005 | van Berkel | |
| 2006/0012581 A1 | 1/2006 | Haim | |
| 2006/0022959 A1 | 2/2006 | Geaghan | |
| 2006/0092142 A1 | 5/2006 | Gillespie et al. | |
| 2006/0097991 A1 | 5/2006 | Hotelling et al. | |
| 2006/0232567 A1 | 10/2006 | Westerman et al. | |
| 2007/0062739 A1 | 3/2007 | Philipp et al. | |
| 2007/0074913 A1 | 4/2007 | Geagan et al. | |
| 2007/0074915 A1 | 4/2007 | Chung et al. | |
| 2007/0084645 A1 | 4/2007 | Chung et al. | |
| 2007/0247172 A1 | 10/2007 | Li | |
| 2007/0257890 A1 | 11/2007 | Hotelling et al. | |
| 2007/0268272 A1 | 11/2007 | Perski et al. | |
| 2007/0285725 A1 | 12/2007 | Lee | |
| 2008/0004505 A1 | 1/2008 | Kapit et al. | |
| 2008/0006453 A1 | 1/2008 | Hotelling | |
| 2008/0078590 A1 | 4/2008 | Sequine | |
| 2008/0087477 A1 | 4/2008 | Cho et al. | |
| 2008/0099254 A1 * | 5/2008 | Katsurahira | 178/18.01 |
| 2008/0106520 A1 | 5/2008 | Free et al. | |
| 2008/0128180 A1 * | 6/2008 | Perski et al. | 178/18.03 |
| 2008/0142281 A1 | 6/2008 | Geaghan | |
| 2008/0158167 A1 | 7/2008 | Hotelling et al. | |
| 2008/0158169 A1 | 7/2008 | O'Connor et al. | |
| 2008/0158175 A1 | 7/2008 | Hotelling | |
| 2008/0162996 A1 | 7/2008 | Krah et al. | |
| 2008/0162997 A1 | 7/2008 | Vu et al. | |
| 2008/0165134 A1 | 7/2008 | Krah | |
| 2008/0225019 A1 | 9/2008 | Hsiung | |
| 2008/0251299 A1 | 10/2008 | Liao et al. | |
| 2008/0309625 A1 | 12/2008 | Krah et al. | |
| 2009/0008162 A1 | 1/2009 | Yang et al. | |
| 2009/0009483 A1 | 1/2009 | Hatching et al. | |
| 2009/0025987 A1 | 1/2009 | Perski | |
| 2009/0065269 A1 * | 3/2009 | Katsurahira | 178/19.06 |
| 2009/0066670 A1 | 3/2009 | Hotelling et al. | |
| 2009/0096757 A1 | 4/2009 | Hotelling et al. | |
| 2009/0096758 A1 | 4/2009 | Hotelling et al. | |
| 2009/0167727 A1 | 7/2009 | Liu et al. | |
| 2009/0194344 A1 | 8/2009 | Harley et al. | |
| 2009/0211821 A1 | 8/2009 | Yeh et al. | |
| 2009/0219258 A1 | 9/2009 | Geaghan et al. | |
| 2009/0244033 A1 | 10/2009 | Westerman | |
| 2009/0256824 A1 | 10/2009 | Hainzl et al. | |
| 2009/0260900 A1 | 10/2009 | Ure | |
| 2009/0284495 A1 | 11/2009 | Geaghan et al. | |
| 2009/0289922 A1 | 11/2009 | Henry | |
| 2009/0315863 A1 | 12/2009 | Underwood et al. | |
| 2010/0006350 A1 | 1/2010 | Elias | |
| 2010/0033437 A1 | 2/2010 | Matsubara | |
| 2010/0300773 A1 | 2/2010 | Cordeiro et al. | |
| 2010/0073323 A1 * | 3/2010 | Geaghan | 345/174 |
| 2010/0085325 A1 * | 4/2010 | King-Smith et al. | 345/174 |
| 2010/0149110 A1 | 6/2010 | Gray | |
| 2010/0155153 A1 | 6/2010 | Zachut | |
| 2010/0170726 A1 | 7/2010 | Yeh et al. | |
| 2010/0188345 A1 | 7/2010 | Keskin | |
| 2010/0315384 A1 * | 12/2010 | Hargreaves et al. | 345/179 |
| 2011/0007021 A1 | 1/2011 | Bernstein | |
| 2011/0122087 A1 * | 5/2011 | Jang et al. | 345/174 |
| 2011/0157080 A1 | 6/2011 | Ciesla | |
| 2012/0050207 A1 * | 3/2012 | Westhues et al. | 345/174 |
| 2012/0050231 A1 * | 3/2012 | Westhues et al. | 345/179 |

(56) References Cited

U.S. PATENT DOCUMENTS

FOREIGN PATENT DOCUMENTS

| | | |
|---|---|---|
| GB | 2072389 | 9/1981 |
| JP | 2288122 | 11/1990 |
| JP | 07/064704 | 3/1995 |
| JP | 08-095701 | 4/1996 |
| JP | 11305932 | 11/1999 |
| JP | 2000/076014 | 3/2000 |
| JP | 2004-005415 | 1/2004 |
| JP | 2007/052639 | 3/2007 |
| JP | 2007183809 A * | 7/2007 |
| JP | 2007-334690 | 12/2007 |
| JP | 2009-110418 | 5/2009 |
| JP | 2009/192306 | 8/2009 |
| JP | 2010-067117 | 3/2010 |
| KR | 10-0453971 | 10/2004 |
| KR | 10-0823518 | 4/2008 |
| WO | WO 2004/019258 A2 | 3/2004 |
| WO | WO 2004/040606 A2 | 5/2004 |
| WO | WO 2006/104745 A2 | 10/2006 |
| WO | WO 2007/017848 A2 | 10/2006 |
| WO | WO 2008/085720 A1 | 7/2008 |

OTHER PUBLICATIONS

Analog Devices AD7142/AD7142-1, Rev. PrD, "Programmable Capicatance-to-Digital Converter with Environmental Compensation", 2005 Analog Devices; Inc., pp. 1-64.

Bao et al.; "DOA Estimation Under Unknown Mutual Coupling and Multipath", IEEE Transactions on Aerospace and Electronic Systems IEEE USA, vol. 41, No. 2, Apr. 2005, pp. 565-573.

Geaghan et al., "Low Cost Mutual Capacitance Measuring Circuits and Methods", Presented at SID Conference, Austin, TX, Jun. 3, 2009, 4 pages.

"Operational_Transconductance_Amplifier", Creative Commons Attribution-ShareALike [On-line], [ updated on the internet Apr. 15, 2010], URL<http://enwikipedia.org/wiki/Operational_transconductance_amplifier>.

QMatrix Data Sheet. Mutual Capacitance QT60486_104, 2003, Quantum Research Group, Ltd., pp. 1-30.

SID Conference Presentation, "Low Cost Mutual Capacitance Measuring Circuit", 3M Touch Systems, San Antonio, Texas, 9 pages, © 2009.

U.S. Appl. No. 12/575,860, "Multi-touch Touch Device with Multiple Drive Frequencies and Maximum Likelihood Estimation", filed Oct. 8, 2009.

U.S. Appl. No. 12/618,874, "Touch Sensitive Device Using Threshold Voltage Signal", filed Nov. 16, 2009.

U.S. Appl. No. 12/652,343, "High Speed Noise Tolerant Multi-touch Touch Device and Controller Therefor", filed Jan. 5, 2010.

U.S. Appl. No. 61/348,173, "High Speed Low Power Multi-touch Touch Device and Controller Therefor", filed May 25, 2010.

* cited by examiner

TOUCH SENSITIVE DEVICE WITH STYLUS SUPPORT

CROSS REFERENCE TO RELATED APPLICATIONS

This application is related to U.S. Patent Application No. 61/182,366, "High Speed Multi-Touch Device and Controller Therefor", filed May 29, 2009; and U.S. Patent Application No. 61/231,471, "High Speed Multi-Touch Device and Controller Therefor" filed Aug. 5, 2009, and U.S. patent application Ser. No. 12/652,343, "High Speed Noise Tolerant Multi-Touch Device and Controller Therefor" filed Jan. 5, 2010.

FIELD OF THE INVENTION

This invention relates generally to touch-sensitive devices, particularly those that rely on a capacitive coupling between a user's finger or other touch implement and the touch device, with particular application to such devices that are capable of detecting multiple touches (from fingers and styli) applied to different portions of the touch device possible at the same time.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

There are two known techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

Within the context of the second technique, various additional techniques have been used to measure the mutual capacitance between electrodes. In one such technique, a capacitor coupled to a receiver electrode is used to accumulate multiple charges associated with multiple pulses of a drive signal. Each pulse of the drive signal thus contributes only a small portion of the total charge built up on this "integrating capacitor". Reference is made to U.S. Pat. No. 6,452,514 (Philipp). This technique has good noise immunity, but its speed may be limited depending upon the number of pulses needed to charge the integrating capacitor.

Touch screens may also support the resolution of the positions of one or more styli. Reference is made to U.S. Pat. No. 5,790,106 (Hirano), which describes applying a voltage oscillating from a pen to electrodes in a touch panel.

BRIEF SUMMARY

The present application discloses, inter alia, touch-sensitive devices capable of detecting the presence of one or more objects, including fingers and styli, located proximate to, or touching, different portions of the touch device, at the same time or at overlapping times. In some embodiments, the touch-sensitive devices need not employ an integrating capacitor in order to measure the capacitive coupling between the drive electrodes and the receive electrodes (associated with the touch panel or the stylus). Rather, in at least some embodiments, a single pulse from a drive signal may be all that is necessary to measure the capacitive coupling between a particular drive electrode (which may be arranged in the stylus or in a the touch sensitive device) and a particular receive electrode (which too may be arranged in the stylus or in the touch sensitive device). To accomplish this, assuming a suitable pulse shape is used for the drive signal, differentiation circuits are preferably coupled to receive electrodes, which in various embodiments may be arranged in a stylus or in a touch panel, so that a differentiated representation of the drive signal, referred to as a response signal, is generated for each receive electrode. In an exemplary embodiment, each differentiation circuit may comprise an operational amplifier (op amp) with a feedback resistor connected between an inverting input of the op amp and the output of the op amp, with the inverting input also being connected to a given receive electrode. Other known differentiation circuit designs can also be used, so long as the circuit provides an output that includes in some form at least an approximation of the derivative with respect to time of the drive signal.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
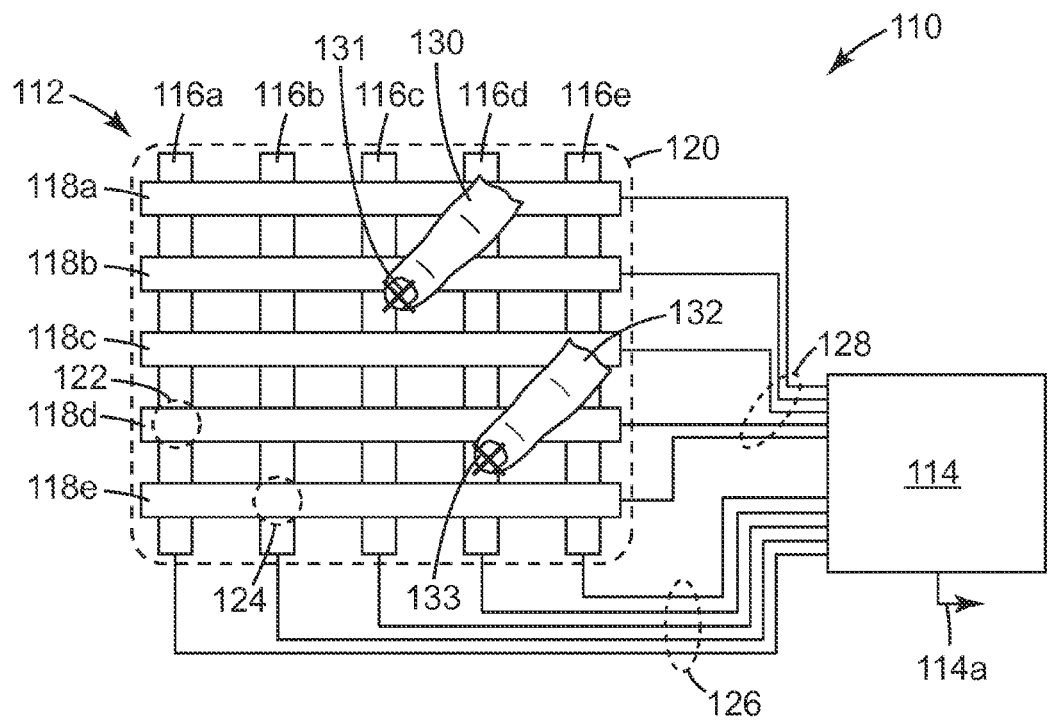
FIG. 1 is a schematic view of a touch device.

In FIG. 1, an exemplary touch device 110 is shown. The device 110 includes a touch panel 112 connected to electronic circuitry, which for simplicity is grouped together into a single schematic box labeled 114 and referred to collectively as a controller.

The touch panel 112 is shown as having a 5×5 matrix of column electrodes 116a-e and row electrodes 118a-e, but other numbers of electrodes and other matrix sizes can also be used. The panel 112 is typically substantially transparent so that the user is able to view an object, such as the pixilated display of a computer, hand-held device, mobile phone, or other peripheral device, through the panel 112. The boundary 120 represents the viewing area of the panel 112 and also preferably the viewing area of such a display, if used. The electrodes 116a-e, 118a-e are spatially distributed, from a plan view perspective, over the viewing area 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In exemplary embodiments the electrodes may be composed of indium tin oxide (ITO) or other suitable electrically conductive materials. From a depth perspective, the column electrodes may lie in a different plane than the row electrodes (from the perspective of FIG. 1, the column electrodes 116a-e lie underneath the row electrodes 118a-e) such that no significant ohmic contact is made between column and row electrodes, and so that the only significant electrical coupling between a given column electrode and a given row electrode is capacitive coupling. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch surface. Additionally, in display-type applications, a back shield may be placed between the display and the touch panel 112. Such a back shield typically consists of a conductive ITO coating on a glass or film, and can be grounded or driven with a waveform that reduces signal coupling into touch panel 112 from external electrical interference sources. Other approaches to back shielding are known in the art. In general, a back shield reduces noise sensed by touch panel 112, which in some embodiments may provide improved touch sensitivity (e.g., ability to sense a lighter touch) and faster response time. Back shields are sometimes used in conjunction with other noise reduction approaches, including spacing apart touch panel 112 and a display, as noise strength from LCD displays, for example, rapidly decreases over distance. In addition to these techniques, other approaches to dealing with noise problems are discussed in reference to various embodiments, below.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, any one of which can be addressed by controller 114 via appropriate selection of one of the control lines 126, which individually couple the respective column electrodes 116a-e to the controller, and appropriate selection of one of the control lines 128, which individually couple the respective row electrodes 118a-e to the controller.

When a finger 130 of a user or other touch implement comes into contact or near-contact with the touch surface of the device 110, as shown at touch location 131, the finger capacitively couples to the electrode matrix. The finger draws charge from the matrix, particularly from those electrodes lying closest to the touch location, and in doing so it changes the coupling capacitance between the electrodes corresponding to the nearest node(s). For example, the touch at touch location 131 lies nearest the node corresponding to electrodes 116c/118b. As described further below, this change in coupling capacitance can be detected by controller 114 and interpreted as a touch at or near the 116a/118b node. Preferably, the controller is configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a. The number of distinct simultaneous or temporally overlapping touches capable of being detected by controller 114 is preferably not limited to 2, e.g., it may be 3, 4, or more, depending on the size of the electrode matrix.

As discussed further below, the controller 114 preferably employs a variety of circuit modules and components that enable it to rapidly determine the coupling capacitance at some or all of the nodes of the electrode matrix. For example, the controller preferably includes at least one signal generator or drive unit. The drive unit delivers a drive signal to one set of electrodes, referred to as drive electrodes. In the embodiment of FIG. 1, the column electrodes 116a-e may be used as drive electrodes, or the row electrodes 118a-e may be so used. The drive signal is preferably delivered to one drive electrode at a time, e.g., in a scanned sequence from a first to a last drive electrode. As each such electrode is driven, the controller monitors the other set of electrodes, referred to as receive electrodes. The controller 114 may include one or more sense units coupled to all of the receive electrodes. For each drive signal that is delivered to each drive electrode, the sense unit(s) generate response signals for the plurality of receive electrodes. Preferably, the sense unit(s) are designed such that each response signal comprises a differentiated representation of the drive signal. For example, if the drive signal is represented by a function f(t), which may represent voltage as a function of time, then the response signal may be or comprise, at least approximately, a function g(t), where $g(t)=d\,f(t)/dt$. In other words, g(t) is the derivative with respect to time of the drive signal f(t). Depending on the design details of the circuitry used in the controller 114, the response signal may include: (1) g(t) alone; or (2) g(t) with a constant offset (g(t)+a); or (3)g(t) with a multiplicative scaling factor (b*g(t)), the scaling factor capable of being positive or negative, and capable of having a magnitude greater than 1, or less than 1 but greater than 0; or (4) combinations thereof, for example. In any case, an amplitude of the response signal is advantageously related to the coupling capacitance between the drive electrode being driven and the particular receive electrode being monitored. Of course, the amplitude of g(t) is also proportional to the amplitude of the original function f(t). Note that the amplitude of g(t) can be determined for a given node using only a single pulse of a drive signal, if desired.

The controller may also include circuitry to identify and isolate the amplitude of the response signal. Exemplary circuit devices for this purpose may include one or more peak detectors, sample/hold buffer, and/or low-pass filter, the selection of which may depend on the nature of the drive signal and the corresponding response signal. The controller may also include one or more analog-to-digital converters (ADCs) to convert an analog amplitude to a digital format. One or more multiplexers may also be used to avoid unnecessary duplication of circuit elements. Of course, the controller also preferably includes one or more memory devices in which to store the measured amplitudes and associated parameters, and a microprocessor to perform the necessary calculations and control functions.

By measuring an amplitude of the response signal for each of the nodes in the electrode matrix, the controller can generate a matrix of measured values related to the coupling capacitances for each of the nodes of the electrode matrix. These measured values can be compared to a similar matrix of previously obtained reference values in order to determine which nodes, if any, have experienced a change in coupling capacitance due to the presence of a touch.

Figure 2:
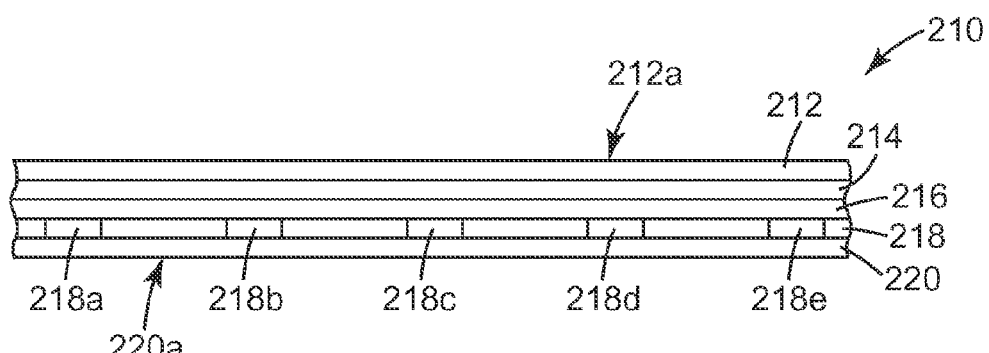
FIG. 2 is a schematic side view of a portion of a touch panel used in a touch device.

Turning now to FIG. 2, we see there a schematic side view of a portion of a touch panel 210 for use in a touch device. The panel 210 includes a front layer 212, first electrode layer 214 comprising a first set of electrodes, insulating layer 216, second electrode layer 218 comprising a second set of electrodes 218a-e preferably orthogonal to the first set of electrodes, and a rear layer 220. The exposed surface 212a of layer 212, or the exposed surface 220a of layer 220, may be or comprise the touch surface of the touch panel 210.

Figure 3A:
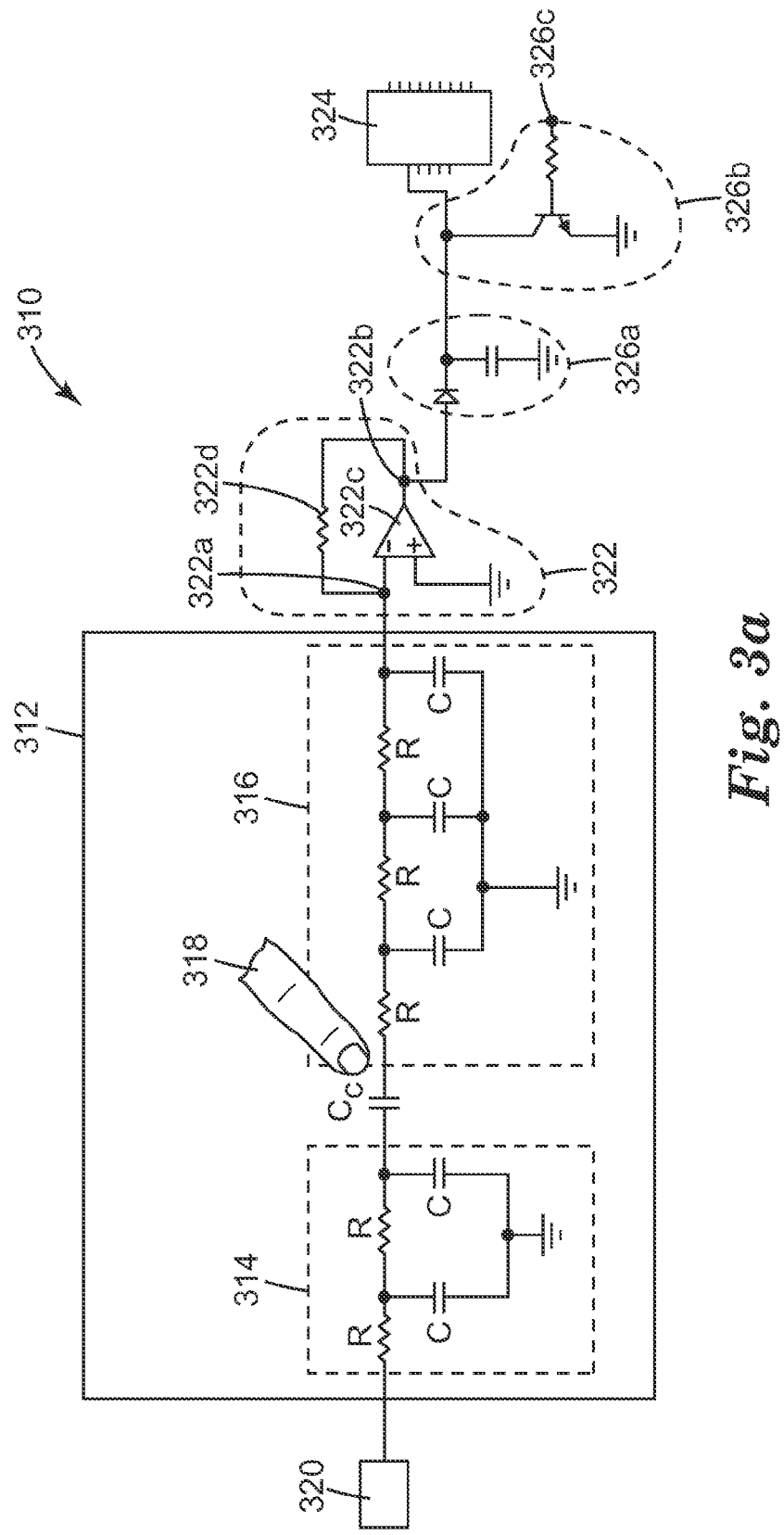
FIG. 3a is a schematic view of a touch device in which relevant drive and detection circuitry is shown in the context of one drive electrode and one receive electrode capacitively coupled thereto.

FIG. 3a depicts a touch device 310 in which relevant controller circuitry, such as drive and detection circuitry, is shown in the context of a touch panel 312 having one drive electrode 314 and one receive electrode 316 capacitively coupled thereto via coupling capacitance $C_c$. The reader will understand that this is a generalization of a touch panel in which drive electrode 314 may be one of a plurality of drive electrodes, and receive electrode 316 likewise may be one of a plurality of receive electrodes, arranged in a matrix on the touch panel.

Indeed, in one specific embodiment of interest capable of use with at least some of the touch measurement techniques described herein, the touch panel may comprise a 40×64 (40 rows, 64 columns) matrix device having a 19 inch diagonal rectangular viewing area with a 16:10 aspect ratio. In this case, the electrodes may have a uniform spacing of about 0.25 inches. Due to the size of this embodiment, the electrodes may have significant stray impedances associated therewith, e.g., a resistance of 40K ohms for the row electrodes and 64K ohms for the column electrodes. For good human factors touch response, the response time to measure the coupling capacitance at all 2,560 nodes of the matrix (40*64=2560) may, if desired, be made to be relatively fast, e.g., less than 20 or even less than 10 milliseconds. If the row electrodes are used as the drive electrodes and the column electrodes used as the receive electrodes, and if all of the column electrodes are sampled simultaneously, then the 40 rows of electrodes have, for example, 20 msec (or 10 msec) to be scanned sequentially, for a time budget of 0.5 msec (or 0.25 msec) per row electrode (drive electrode).

The drive electrode 314 and receive electrode 316 of FIG. 3a, which are depicted by their electrical characteristics (in the form of lumped circuit element models) rather than by their physical characteristics, are representative of electrodes that may be found in a touch device having a matrix smaller than 40×64, but this is not to be considered limiting. In this representative embodiment of FIG. 3a, the series resistances R shown in the lumped circuit models may each have values of 10K ohms, and the stray capacitances C shown in the lumped circuit models may each have values of 20 picofarads (pf), but of course these values are not to be taken as limiting in any way. In this representative embodiment the coupling capacitance $C_c$ is nominally 2 pf, and the presence of a touch by a user's finger 318 at the node between electrodes 314, 316 causes the coupling capacitance $C_c$ to drop by about 25%, to a value of about 1.5 pf. Again, these values are not to be taken as limiting.

In accordance with the controller described earlier, the touch device 310 uses specific circuitry to interrogate the panel 312 so as to determine the coupling capacitance $C_c$ at each of the nodes of the panel 312. In this regard, the reader will understand that the controller may determine the coupling capacitance by determining the value of a parameter that is indicative of, or responsive to, the coupling capacitance, e.g., an amplitude of a response signal as mentioned above and described further below. To accomplish this task, the device 310 preferably includes: a low impedance drive unit 320 coupled to the drive electrode 314; a sense unit 322 coupled to the receive electrode 316, which, in combination with the coupling capacitance, performs a differentiation on the drive signal supplied by the drive unit; and an analog-to-digital converter (ADC) unit 324 that converts an amplitude of the response signal generated by the sense unit 322 into a digital format. Depending on the nature of the drive signal supplied by the drive unit 320 (and hence also on the nature of the response signal generated by the sense unit 322), the device 310 may also include a peak detection circuit 326a which in this embodiment also serves as a sample/hold buffer, and an associated reset circuit 326b operable to reset the peak detector. In most practical applications the device 310 will also include a multiplexer between the signal generator 320 and the touch panel 312, so as to have the capability of addressing any one of a plurality of drive electrodes at a given time, as well as a multiplexer between the sense unit 322 (or between the optional circuit 326b) and the ADC unit 324, to allow a single ADC unit to rapidly sample the amplitudes associated with multiple receive electrodes, thus avoiding the expense of requiring one ADC unit for each receive electrode.

The drive unit 320 preferably is or includes a voltage source with an internal impedance that is preferably low enough to maintain good signal integrity, reduce injected noise, and/or maintain fast signal rise and fall times. The drive unit 320 provides a time-varying drive signal at an output thereof to the drive electrode 314. The drive signal may consist essentially of a single, isolated pulse, or it may comprise a plurality of such pulses or a train of pulses that form a continuous AC waveform, or waveform packet, such as a sinusoidal wave, a square wave, a triangle wave, and so forth. In this regard, the term "pulse" is used in a broad sense to refer to a distinctive signal variation and is not limited to a rectangular shape of short duration and high amplitude. If rapid detection of touch(es) on the touch panel is desired, the drive signal preferably includes only the smallest number of pulses necessary to obtain a reliable measurement of the coupling capacitance at a given node. This becomes particularly important for touch panels that have large electrode matrices, i.e., a large number of nodes to sense. The peak or maximum amplitude of the drive pulse(s) is preferably relatively high, e.g., from 3 to 20 volts, to provide good signal-to-noise ratios. Though shown in FIG. 3a as driving electrode 314 from only one end, in some embodiments drive unit 320 may be configured to drive electrode 314 from both of its ends. This may be useful, for example, when electrode 314 has high resistance (thus increased drive signal attenuation and susceptibility to noise contamination), as may exist on large ITO-based matrix-type touch sensors.

The reader should keep in mind that there may be a distinction between the drive signal provided at the output of drive unit 320, and the drive signal being delivered to a particular drive electrode 314. The distinction becomes important when, for example, a multiplexer or other switching device is placed between the drive unit 320 and the touch panel 312 in order to selectively couple the drive unit to a plurality of drive electrodes, e.g., one at a time. In such a case, the drive unit 320 may have at its output a continuous AC waveform, such as square wave, triangle wave, or the like, yet by virtue of the switching action of the multiplexer, only one pulse of such a waveform, or only a few pulses, may be delivered to any given drive electrode at a time. For example, one pulse of a continuous AC waveform may be delivered to a first drive electrode, the next pulse of the AC waveform may be delivered to the next drive electrode, and so on until all drive electrodes have been driven, whereupon the next pulse of the AC waveform is delivered again to the first drive electrode and so forth in a repeating cycle.

As will be explained further below in connection with FIGS. 4-6, the shape of the pulses used in the drive signal may have an impact on the choice of detection/measurement electronics to be used in the device. Examples of useable pulse shapes include rectangle pulses, ramped pulses (whether symmetric or asymmetric), and sine wave (e.g., bell-shaped) pulses.

The drive unit 320 may if desired be programmable to provide different pulses at different times. For example, if the drive unit is coupled to a plurality of drive electrodes through a multiplexer, the drive unit may be programmed to provide different signal levels for different drive electrodes to compensate for electrode-to-electrode variations in line resistance and stray capacitance. For example, a drive electrode disposed at a position that requires a long conduction length through the receive electrode(s) is beneficially driven with a higher amplitude drive signal than a drive electrode disposed at a position that requires a shorter conduction length, so as to compensate for losses associated with the receive electrodes. (For example, referring to the electrode matrix of FIG. 1, if row electrodes 118a-e are the drive electrodes, then a drive signal on electrode 118a is coupled through longer lengths of the receive electrodes 116a-e than a drive signal on electrode 118e due to the placement of the control lines 126 proximate electrode 118e.) Providing different drive signal levels for different drive electrodes in this way is particularly advantageous for large electrode matrices, because rather than programming a large number of detection circuits (corresponding to the number of receive electrodes) for losses in the touch screen, only one drive signal is adjusted by a selected amount, with drive signals delivered to different drive electrodes being adjusted by differing amounts as appropriate.

The drive signal provided to the drive electrode 314 is capacitively coupled to receive electrode 316 via the coupling capacitance $C_c$, the receive electrode in turn being connected to sense unit 322. The sense unit 322 thus receives at an input thereof 322a the drive signal (as transmitted by the electrodes 314, 316 and coupling capacitance $C_c$), and generates therefrom a response signal at an output 322b. Preferably, the sense unit is designed so that the response signal includes a differentiated representation of the drive signal, an amplitude of which is responsive to the coupling capacitance $C_c$. That is, the response signal generated by the sense unit preferably includes in some form at least an approximation of the derivative with respect to time of the drive signal. For example, the response signal may include the time derivative of the drive signal, or a version of such signal that is inverted, amplified (including amplification less than 1), offset in voltage or amplitude, and/or offset in time, for example. To repeat from the earlier discussion, if the drive signal delivered to the drive electrode is represented by a function f(t), then the response signal may be or comprise, at least approximately, a function g(t), where g(t)=d f(t)/dt.

An exemplary circuit to perform such function is shown in FIG. 3a. The input to such circuit, shown at 322a, is the inverting input (−) of an operational amplifier 322c. The other input of the op amp, a non-inverting input (+), is set to a common reference level that can be optimized for maximum signal range. In FIG. 3, this reference level is shown as ground potential for simplicity, but non-zero offset voltages can also be used. A feedback resistor 322d is connected between the output of the op amp at 322b and the inverting input. When connected in this way, the inverting input of the op amp 322c, i.e., the input 322a, is maintained as a virtual ground summing point, and no signal is observed at that point. This also means that the receive electrode 316 is maintained at a constant voltage substantially equal to the voltage at which the non-inverting input of the op amp is held. The feedback resistor 322d can be selected to maximize signal level while keeping signal distortion low, and can be otherwise set or adjusted as described herein.

The op amp 322c connected in this fashion, in combination with the coupling capacitance $C_c$, has the effect of producing a differentiated representation of the drive signal that is delivered to drive electrode 314. In particular, the current I flowing through the feedback resistor 322d at any given time is given by:

$$I \approx C_c * dV/dt,$$

where $C_c$ is the coupling capacitance, V represents the time-varying drive signal delivered to the drive electrode, and dV/dt is the derivative with respect to time of V. Although this equation is nominally correct, the reader will understand that it does not take into account various second order effects caused by, for example, parasitic resistance and capacitance of the electrodes being used, op amp characteristics and limitations, and the like, which can affect both the magnitude and the dynamic response of the current I. Nevertheless, the current I, flowing through the feedback resistor, produces a voltage signal at the output 322b which corresponds to the response signal discussed above. Due to the direction of current flow through the feedback resistor, this response signal is inverted insofar as a positive dV/dt (V increases with time) produces a negative voltage at output 322b, and a negative dV/dt (V decreases with time) produces a positive voltage at output 322b, with specific examples given below in connection with FIGS. 4-6. This can be expressed as:

$$V_{RS} \approx -R_f * C_c * dV/dt,$$

where $V_{RS}$ represents the response signal voltage at the output 322b at any given time, and $R_f$ is the resistance of feedback resistor 322d. Note that the amplitude (voltage) of the response signal is nominally proportional to the coupling capacitance $C_c$. Thus, since a touch at the node of the electrodes 314, 318 reduces the coupling capacitance $C_c$, a measure of the peak amplitude or other characteristic amplitude of the response signal provided by sense unit 322 can be analyzed to determine the presence of a touch at that node.

In embodiments in which receive electrode 316 is one of a plurality of receive electrodes, it may be desirable to include a dedicated sense unit 322 for each receive electrode. Further, it may be advantageous to provide different amounts of amplification (e.g., different feedback resistor values for the different op amps) for the different sense units to compensate for signal losses in the touch screen that are different for different drive electrodes. For example, a receive electrode disposed at a position that requires a long conduction length through the drive electrode(s) is beneficially provided with a greater amplification than a receive electrode disposed at a position that requires a shorter conduction length, so as to compensate for losses associated with the drive electrodes. (For example, referring to the electrode matrix of FIG. 1, if row electrodes 116a-e are the receive electrodes, then a signal received from electrode 116a is coupled through longer lengths of the drive electrodes 118a-e than a signal received from electrode 116e due to the placement of the control lines 128 proximate electrode 116e.) Providing different amounts of amplification for different receive electrodes in this way is particularly advantageous for large electrode matrices, because it can reduce the need to program a large number of detection circuits (corresponding to the number of receive electrodes) for losses in the touch screen.

As mentioned above, device 310 may also include peak detection circuit 326a which in this embodiment also serves as a sample/hold buffer, and an associated reset circuit 326b operable to reset the peak detector. These circuit elements can be used in cases where the peak amplitude of the response signal generated by the sense unit 322 is to be used as a measure of the coupling capacitance $C_c$. Such cases can include embodiments in which the response signal provided by the sense unit 322 is highly transient, e.g., in cases where one or more rectangle pulses are used for the drive signal (see e.g. FIG. 4a below). In such cases, the peak detector 326a operates to maintain the peak amplitude of the response signal for a relatively long time to allow reliable sampling and conversion to a digital value by the ADC 324. In embodiments having a plurality of receive electrodes, a single ADC may be cyclically coupled to the detection circuitry of each receive electrode, requiring each detection circuit to maintain the measurement voltage for an extended period of time. After the measurement is made by the ADC 324, the peak detector can be reset by operation of reset circuit 326b so that a new peak value can be measured in a subsequent cycle.

The basic operation of the diode/capacitor combination depicted for peak detector 326a, including its ability to maintain the peak voltage for an extended period without discharging the capacitor through the sense unit 322, will be apparent to the person of ordinary skill in the art, with no further explanation being necessary. Likewise, the basic operation of the reset circuit 326b, responding to a suitable reset control signal provided at contact 326c, will be apparent to the person of ordinary skill in the art. Note that other known electronic devices capable of carrying out one or more functions of the described sense unit, peak detector, sample/hold buffer, and/or reset circuit, whether in hardware, software, or combinations thereof, are fully contemplated herein.

As mentioned previously, the ADC 324 is preferably provided to convert the amplitude value associated with the response signal to a digital format for use with digital components such as a microprocessor for further processing. The ADC may be of any suitable design, e.g., it may comprise a high speed successive approximation register (SAR) and/or a sigma-delta type converter.

With regard to further processing of the measured amplitude value of a given node, the measured amplitude value can be stored in a memory register. If desired, multiple such values associated with the given node may be stored and averaged, e.g. for noise reduction purposes. Furthermore, the measured amplitude value is preferably compared to a reference value in order to determine if a reduction of the coupling capacitance has occurred, i.e., if some amount of touch is present at the given node. Such comparison may involve subtraction of the measured value from the reference value, for example. In embodiments involving a large touch matrix containing many nodes, the measured values for all of the nodes can be stored in memory, and individually compared to respective reference values in order to determine if some amount of touch is present at each node. By analyzing the comparison data, the positions of multiple temporally overlapping touches, if present on the touch surface, can be determined. The number of temporally overlapping touches capable of being detected may be limited only by the dimensions of the electrode grid in the touch panel and the speed of the drive/detection circuitry. In exemplary embodiments, interpolation is performed for differences detected for neighboring nodes so as to accurately determine a touch location lying between nodes.

Figure 3B:
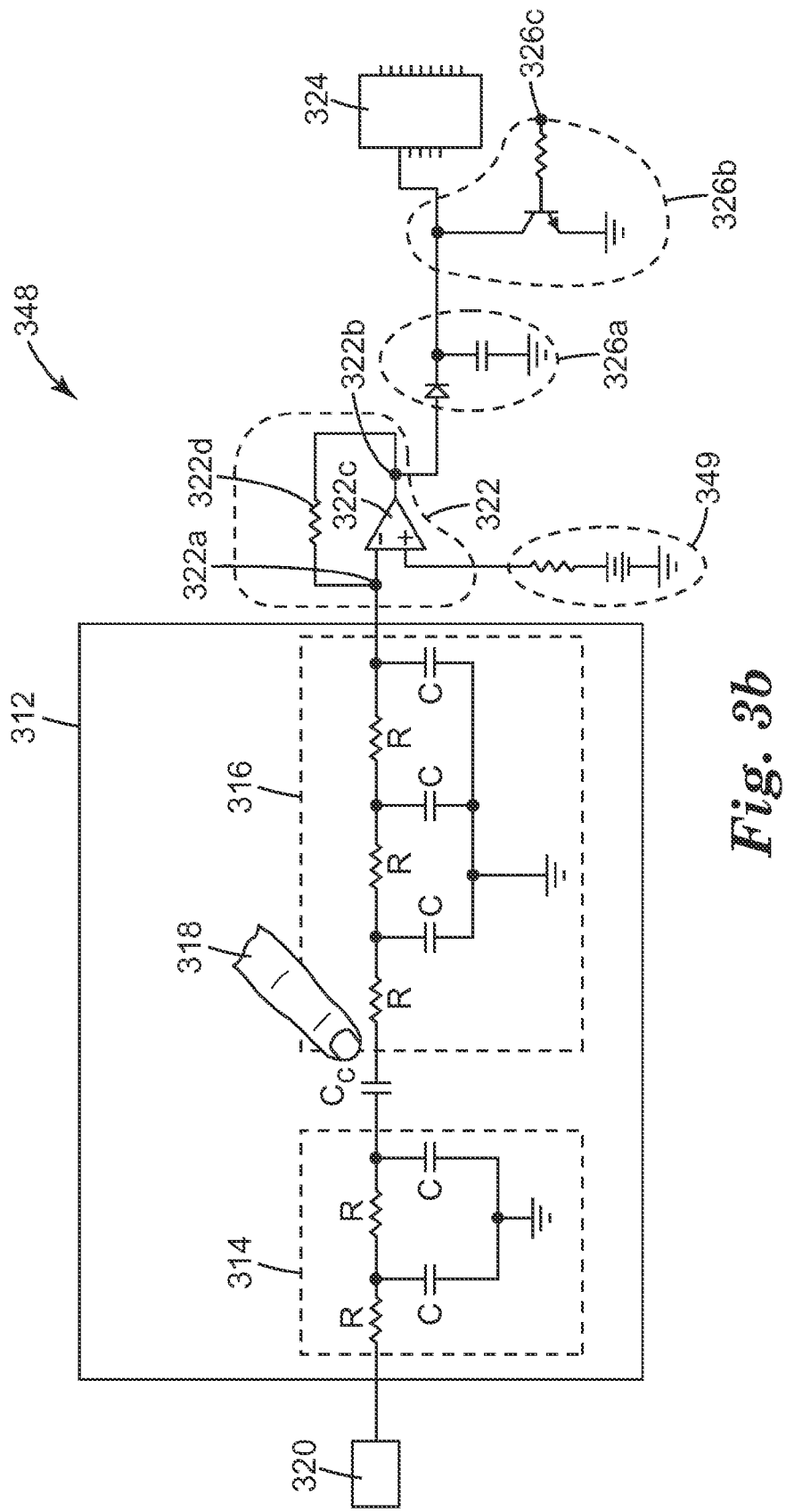
FIG. 3b is a schematic view of a touch sensitive device similar to that of FIG. 3a, but including additional circuitry to account for differences of signal strength on receiver electrodes.

FIG. 3b depicts touch device 348 which is similar to touch device 310 shown in FIG. 3a, except that it includes voltage source 349 as an input to the differentiating amplifier that is part of sense unit 322. This voltage input may be configured as needed to bring circuit output into a sensing range for the ADC. For example, some ADCs have sensing ranges from 0.5V to +3V. The peak of the sense unit 322 output signal should be within this range to digitize the voltage accurately. Voltage source 349 (or gain, in the context of sense unit 322) can be fixed at one voltage for all receiver electrodes, or it can be adjusted for particular receive electrodes. In some embodiments, differing voltages are provided to sense units in groups of 4-10 receive electrodes using a resistor ladder network. In some embodiments, gain is set to compensate for signal drop off due to resistance on the driven electrodes.

Figure 3C:
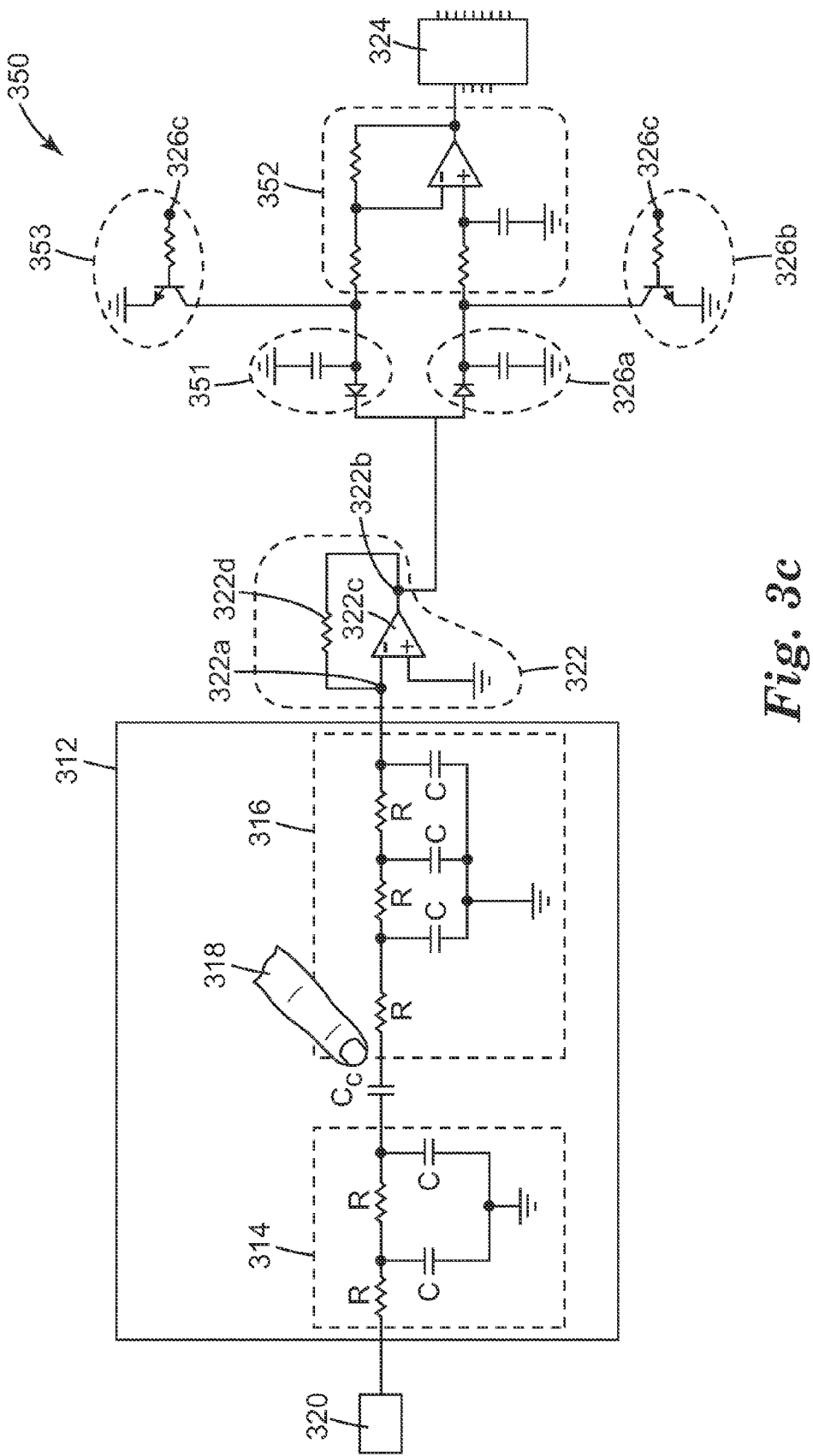
FIG. 3c is a schematic view of a touch sensitive device similar to that of FIG. 3a, but including additional circuitry to account for noise from, for example, a display.

FIG. 3c depicts touch device 350 which is similar to touch device 310 shown in FIG. 3a, but containing additional circuitry that in some embodiments may better accommodate noise from displays such as LCD displays. LCD addressing frequencies are generally near or overlapping the frequencies used by controller 114 to interface with touch panel 112. This results in noise on the receiver electrodes which may show up as a common mode signal. A differential amplifier may be used to eliminate this common mode signal. The circuit shown in FIG. 3c adds a differential amplifier 352 and additional peak detection circuit 351 (configured to detect peaks of negative voltage), and an additional reset circuit 353.

Figure 3D:
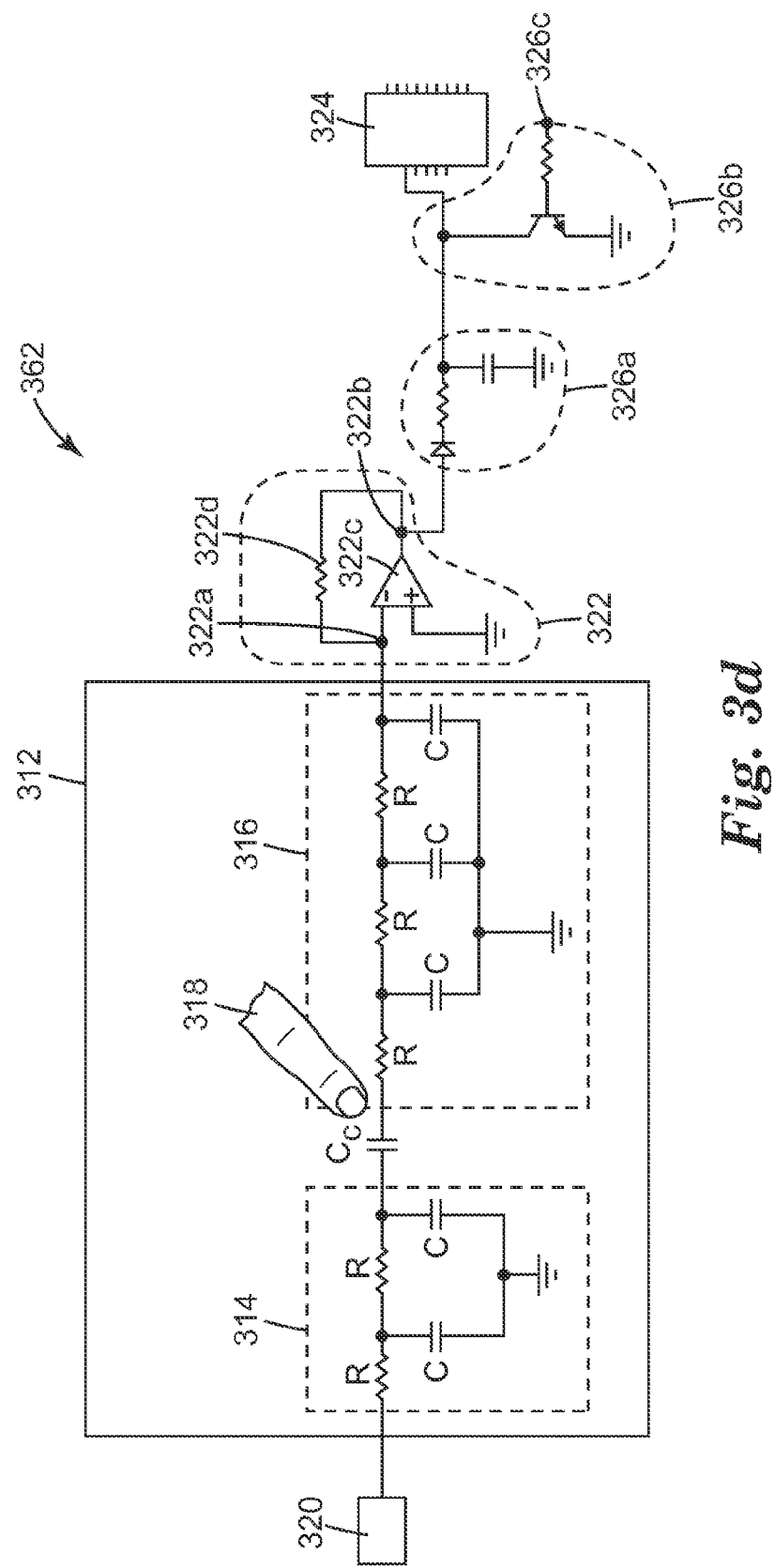
FIG. 3d is a schematic view of a touch sensitive device similar to that of FIG. 3a, but including additional circuitry to accommodate noise from, for example, a display.

FIG. 3d depicts touch device 362 which is similar to touch device 310 shown in FIG. 3a, but containing additional circuitry that in some embodiments may better accommodate noise from displays such as LCD displays, and more particularly LCD displays employing in-plane switching technology, which improves display viewing angle but introduces certain noise artifacts into an adjacently disposed touch sensor. The noise artifacts may be characterized by electromagnetic interference in the same frequency band as the pulses and signals applied to the drive electrode. FIG. 3d adds a resistor after sense unit 322, but before the capacitor that is shown as included in peak detection circuit 326a. The resistor is shown implemented after the diode in peak detection circuit 326a, but it may also be implemented before the diode. This resistor limits the charging effect in peak detection circuit 326a from any pulse or signal applied to a drive electrode. Thus an increased number of pulses may be used in a measurement cycle (for example, 8 pulses rather than 3), which reduces the impact of some portion of those pulses being contaminated by positive noise pulses, or produced by positive anomalous noise. Of course, an increased number of pulses may be used in an embodiment such as 3a that does not contain the additional resistor of FIG. 3d and with it a relatively larger capacitor used in peak detection circuit 326a. However, the peak detection circuit 326a is discharged after each sample cycle, and the discharge time is commensurate with the amount of charge held by the capacitor. The additional resistor of FIG. 3d allows for a smaller charge accumulated in the capacitor of peak detection circuit 326a, which allows for faster discharge time.

Figure 3E:
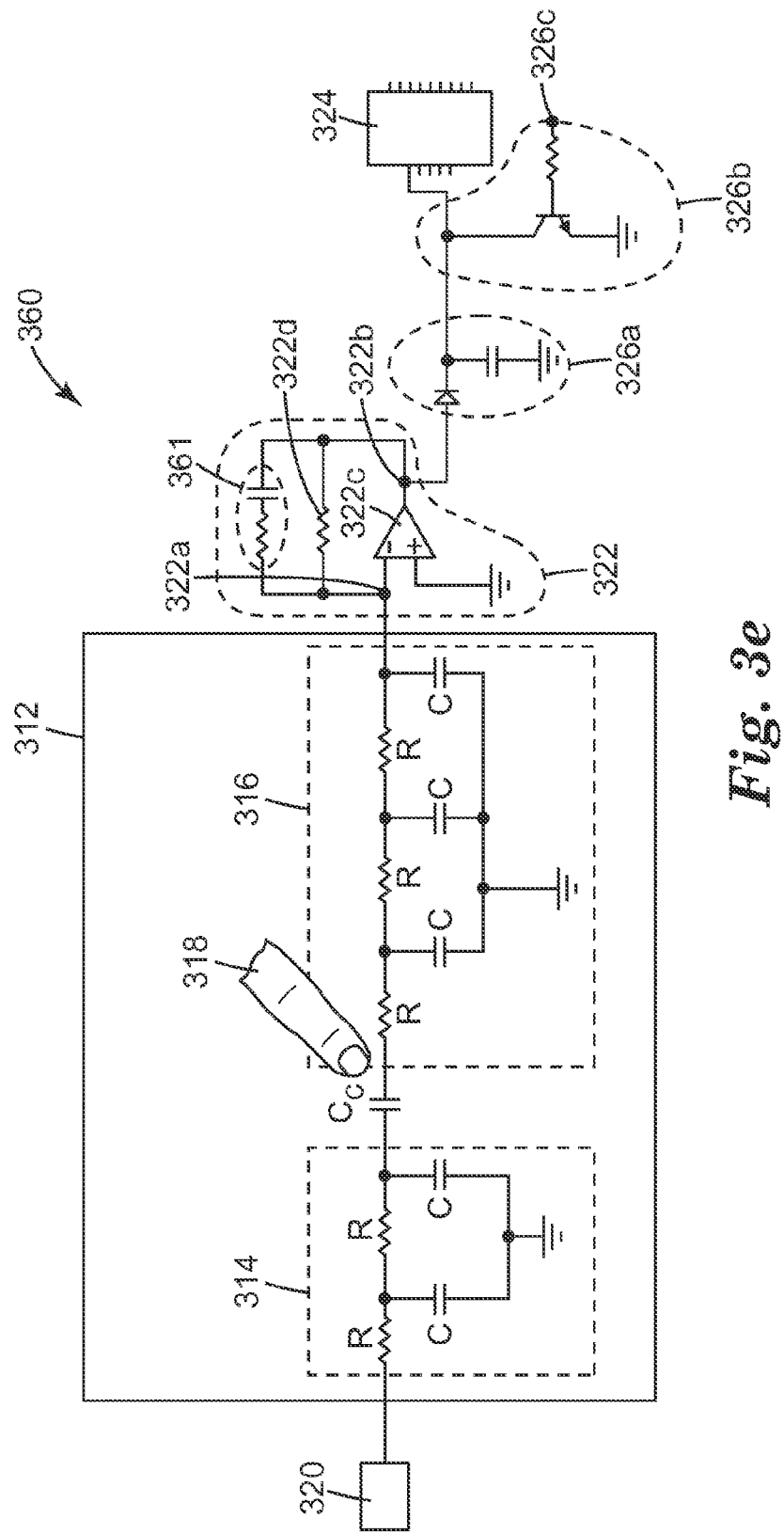
FIG. 3e is a schematic view of a touch sensitive device similar to that of FIG. 3a, but including additional circuitry to accommodate, for example, a low impedance touch screen.

FIG. 3e depicts touch device 360, which is similar to touch device 310 shown in FIG. 3a, but containing additional circuitry that in some embodiments may better accommodate touch panel having electrodes with lower resistance. Such touch panels may have electrodes comprised of copper, gold, silver, or other metallic micro-wires, and have resistance levels of <10K ohms. To accommodate lower resistance electrodes, touch device 360 adds the resistor and capacitor depicted in low impedance stability circuit 361. This additional circuitry stabilizes amplifier 322c's loop gain by adding 45 degrees of phase margin at the amplifier unity loop gain crossover frequency.

Any of the embodiments shown in FIG. 3a through 3e could be embodied in, for example, an application specific integrated circuit (ASIC).

Figure 4A:
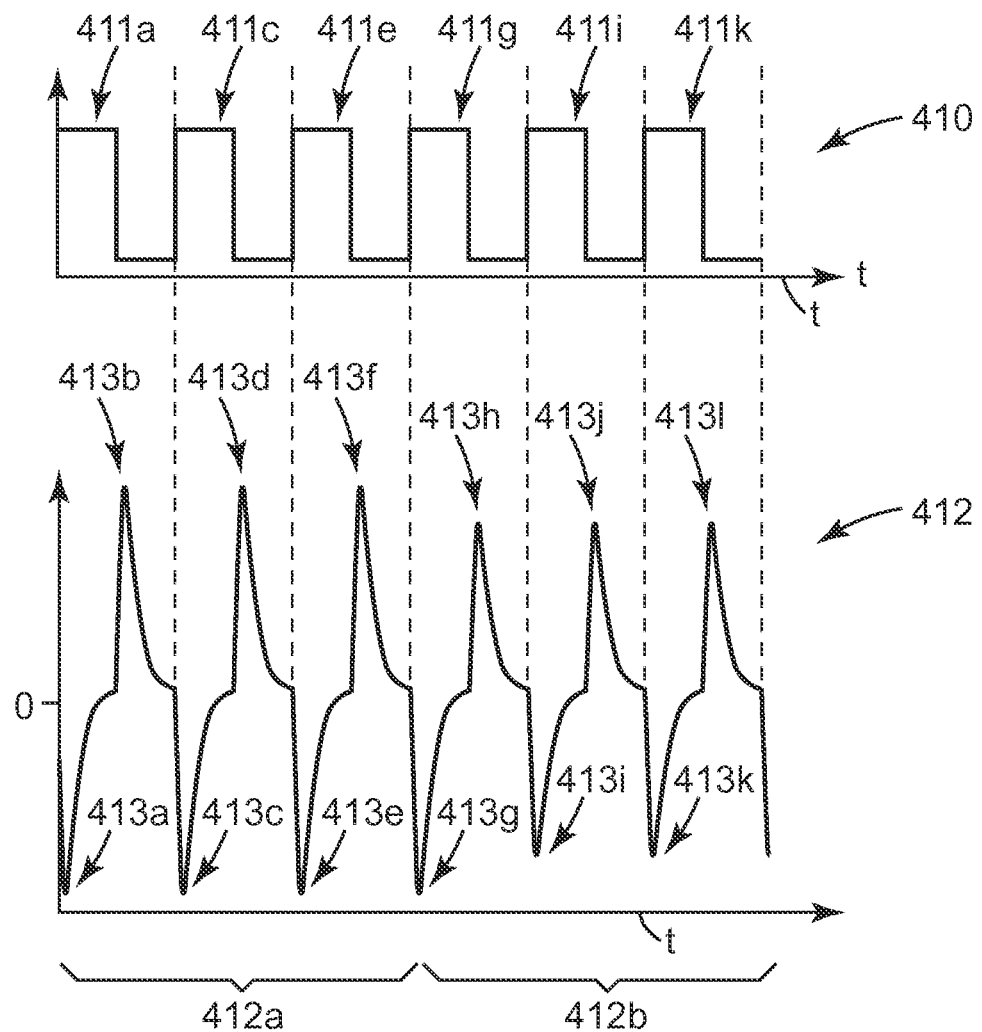
FIG. 4a is a graph of a drive signal and a corresponding (modeled) response signal for the touch device of FIG. 3a, wherein the drive signal includes rectangle pulses and the response signal includes impulse pulses.

Turning now to FIG. 4a, we see there a voltage vs. time graph of a particular drive signal 410 and a corresponding voltage vs. time graph of a (modeled) response signal 412 generated by a sense unit of the type depicted in FIG. 3a. For purposes of the model, the electronic characteristics of the drive electrode, receive electrode, and coupling capacitance (including the effect of a touch thereon, i.e., decreasing the capacitance from 2.0 pf to 1.5 pf) were assumed to be as described above in connection with the representative embodiment of FIG. 3a. Furthermore, the feedback resistor 322d for the op amp 322c was assumed to be on the order of 2M ohms.

The drive signal 410 is seen to be a square wave, containing a series of rectangle pulses 411a, 411c, 411e, . . . . 411k. This entire signal was assumed to be delivered to a particular drive electrode, although in many embodiments a smaller number of pulses, e.g. only one or two, may be delivered to a given drive electrode at a given time, after which one or more pulses may be delivered to a different drive electrode, and so on. The response signal 412 generated by the sense unit is seen to comprise a plurality of impulse pulses 413a-l, two for each rectangle pulse 411a, as one would expect for a differentiated square wave. Thus, for example, the drive pulse 411a yields a negative-going impulse pulse 413a associated with the positive-going transition (left side) of the rectangle pulse, and a positive-going impulse pulse 413b associated with the negative-going transition (right side) of the rectangle pulse. The impulse pulses are rounded as a result of the op amp signal bandwidth and the RC filter effects of the touch screen. Despite these deviations from an ideal derivative with respect to time of signal 410, the response signal 412 can be considered to comprise a differentiated representation of the drive signal.

As shown, the drive pulses 411a, 411c, 411e, . . . 411k, all have the same amplitude, although pulses of differing amplitude can also be delivered as explained above. However, despite the common amplitude of the drive pulses, the impulse pulses 413a-g occurring in the time period 412a are seen to have a first peak amplitude, and impulse pulses 413h-l occurring in the time period 412b are seen to have a second peak amplitude less than the first peak amplitude. This is because the model introduced a change in coupling capacitance $C_c$ at a point in time after impulse pulse 413g and before impulse pulse 413h, the change corresponding to a transition from a non-touch condition ($C_c$=2 pf) to a touch condition ($C_c$=1.5 pf). The reduced peak amplitude of the impulse pulses during time period 412b can be readily measured and associated with a touch event at the applicable node.

The transient nature of the impulse pulses 413a-l make them particularly suited for use with a peak detector and sample/hold buffer as described in connection with FIG. 3, so that an accurate measurement of the peak amplitude can be obtained and sampled by the ADC.

Figure 4B:
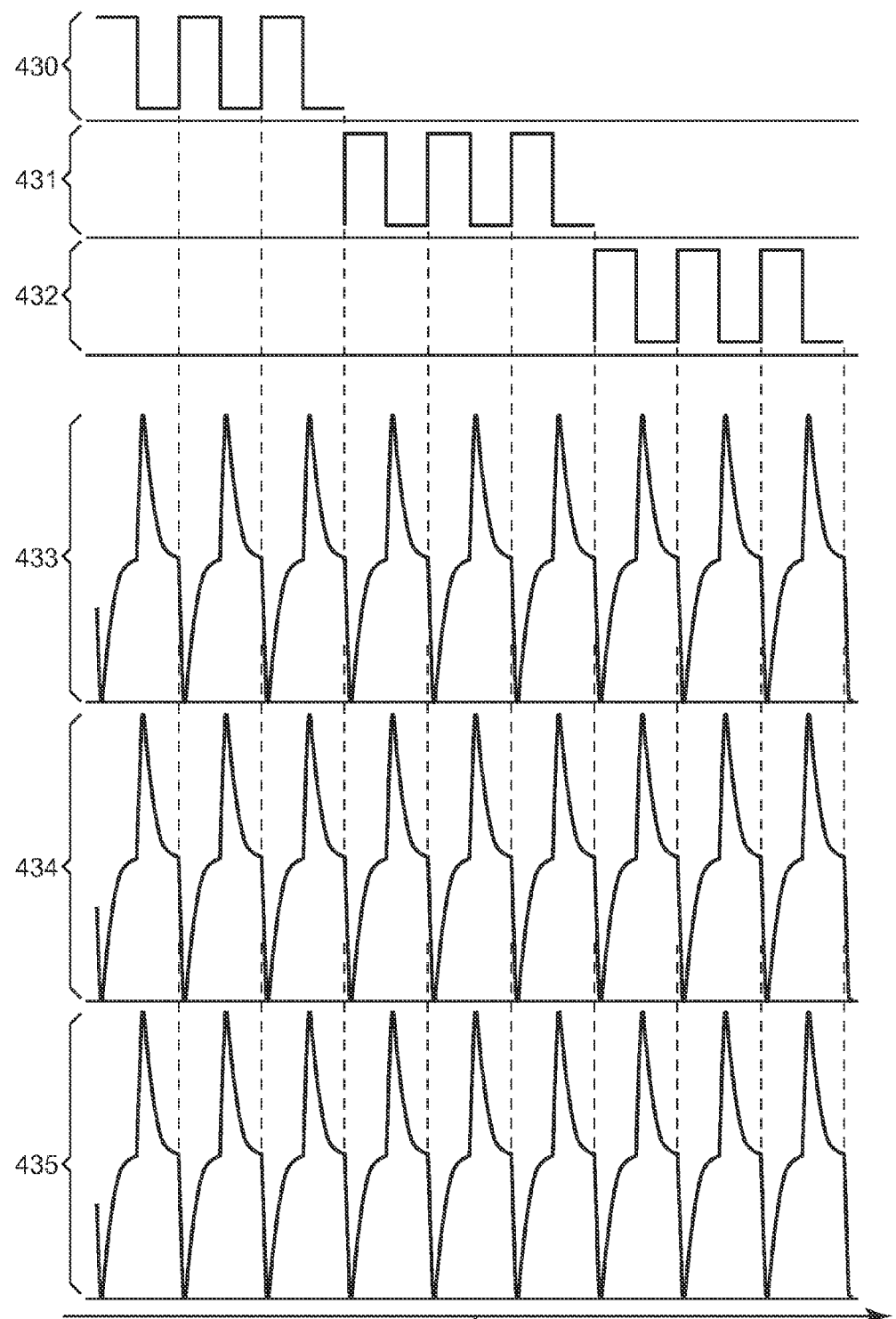
FIG. 4b is a graph showing modeled waveforms for three driven electrodes, and associated response waveforms on three receive electrodes.

FIG. 4b depicts graphs showing representative waveforms from an embodiment that includes sequential driving of driven electrodes. Waveforms 430, 431, and 432 are representative of pulsed signals during a period of time, t, on three separate (possibly adjacent one another) driven electrodes (a first, second, and third row on a matrix-type sensor, for example). Waveforms 433, 434, and 435 are representative of differentiated output resulting from the pulsed signals on three separate receive electrodes (columns on a matrix-type sensor, for example) during the same time period. Note that each receive electrode (column) has a similar response profile. The driven electrodes corresponding to waveforms 432, 431, and 431 are driven sequentially. After each an electrode is driven (represented by any individual ones of waveforms 430, 431, or 432), a voltage representative of peak amplitude will be available in the peak detect circuit associated with each receive electrode (column) as described above in connection with FIG. 3. Thus, after each driven electrode is driven (row), the resultant voltage on the peak detect circuit for all receive electrodes (columns) is sampled, then the associated peak detect circuit reset, then the next sequential driven electrode is driven (and so on). In this way, each node in the matrix-type capacitive touch sensor can be individually addressed and sampled.

Figure 5A:
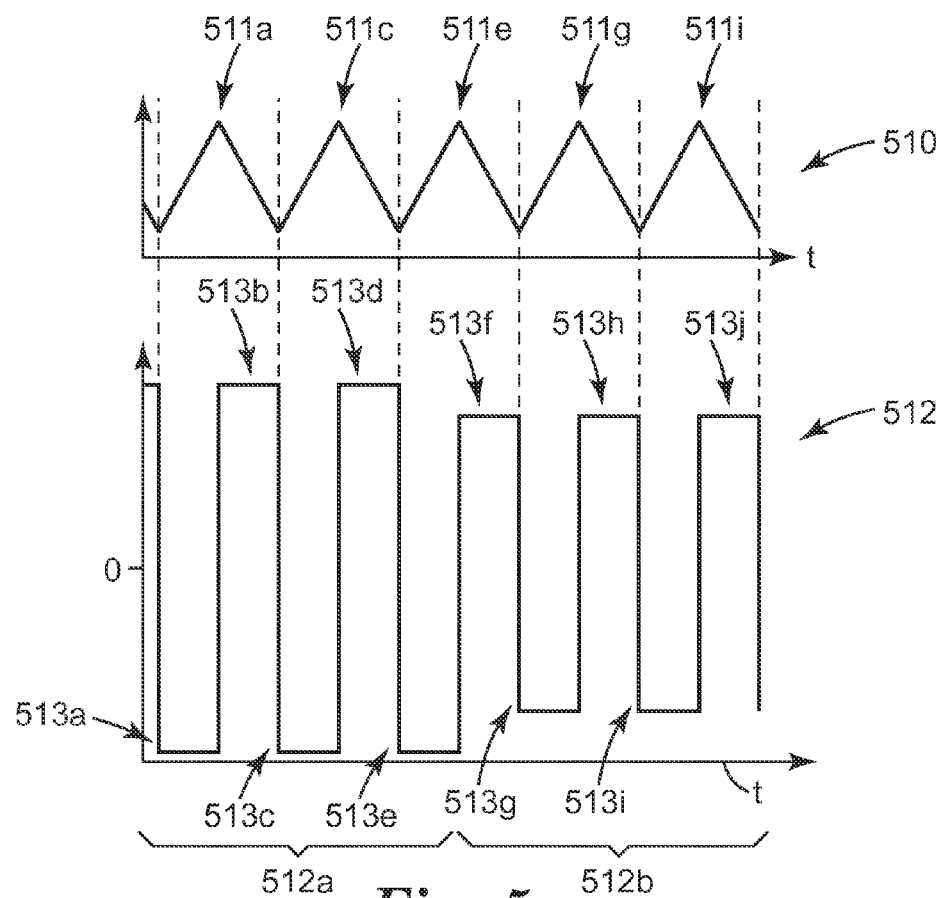
FIG. 5a is a graph similar to that of FIG. 4a but for a different drive signal, the drive signal including ramped pulses and the response signal including rectangle-like pulses.

FIG. 5a depicts a pair of graphs similar to those of FIG. 4a, and for the same electronic configuration of drive electrode, receive electrode, coupling capacitance, and sense unit, but for a different drive signal shape. The drive signal 510 of FIG. 5a includes ramped pulses 511a, 511c, 511e, . . . 511i, so that the resultant response signal 512 includes rectangle pulses 513a-j. The rectangle pulses predicted by the model exhibited near-vertical hi/lo transitions with slightly rounded corners, which have been redrawn as vertical lines and sharp corners for simplicity. The rise and fall times of the rectangle pulses are limited by the RC transmission line in the drive and receive electrodes being used. The drive pulses 511a, etc. are characterized by a symmetrical ramp shape, with the first half of each pulse having a positive-going slope and the second half having a negative-going slope of the same magnitude. This symmetry is also then carried over to the response signal 512, where negative-going pulses 513a, 513c, and so forth are substantially balanced by positive-going pulses 513b, 513d, and so on. Similar to the description of FIG. 4a, the model introduces a change in coupling capacitance $C_c$ at a point in time after rectangle pulse 513e and before rectangle pulse 513f, i.e., in the transition from time period 512a to time period 512b, the change corresponding to a transition from a non-touch condition ($C_c$=2 pf) to a touch condition ($C_c$=1.5 pf). The reduced amplitude of the response signal pulses occurring during time period 412b can be readily measured and associated with a touch event at the applicable node. A feature of FIG. 5a worth noting is the relatively steady-state characteristic (over the time scale of given pulse) of the response signal 512 at each plateau of each pulse 513a-j, where the "plateau" of a negative-going pulse 513a, 513c, and so on is understood to be the "bottom" of the pulse shape rather than the "top" as with pulses 513b, d, and so forth. This steady-state characteristic is a consequence of the drive pulses having a constant slope over a substantial portion of the drive pulses, i.e., a ramped shape. In some embodiments, the touch device designer may wish to take advantage of this steady-state characteristic so as to eliminate unnecessary circuit items and reduce cost. In particular, since the response signal itself maintains a substantially constant amplitude (the plateau of a pulse) over the time scale of the pulse, and since this constant amplitude is indicative of or responsive to the coupling capacitance $C_c$, the peak detector, sample/hold buffer, and reset circuit described in connection with FIG. 3a may no longer be necessary and may be eliminated from the system, provided the time scale of the steady-state characteristic is long enough for the ADC to sample and measure the amplitude. If desired, for noise-reduction, the response signal generated by the sense unit in such cases can be sent through a low-pass filter whose cutoff frequency is selected to substantially maintain the same overall fidelity or shape as the unfiltered pulses while filtering out higher frequency noise. The output of such a filter, i.e., the filtered response signal, may then be supplied to the ADC. Of course, in some cases it may be desirable to keep the peak detector, sample/hold buffer, and reset circuit, whether or not the low-pass filter is utilized, for ramp-type drive pulses.

If desired, a rectifying circuit can be used in touch device embodiments that produce positive- and negative-going pulses in the response signal, see e.g. signal 412 of FIG. 4a and signal 512 of FIG. 5a. The rectification of these signals may have corresponding benefits for other circuit functions, such as peak detection and analog-to-digital conversion. In the case of signal 512 of FIG. 5a, a rectified version of that signal advantageously maintains a steady-state voltage level substantially continuously (ignoring transient effects due to op amp limitations and RC transmission line effects) as a result of the symmetry of the respective signals.

Figure 5B:
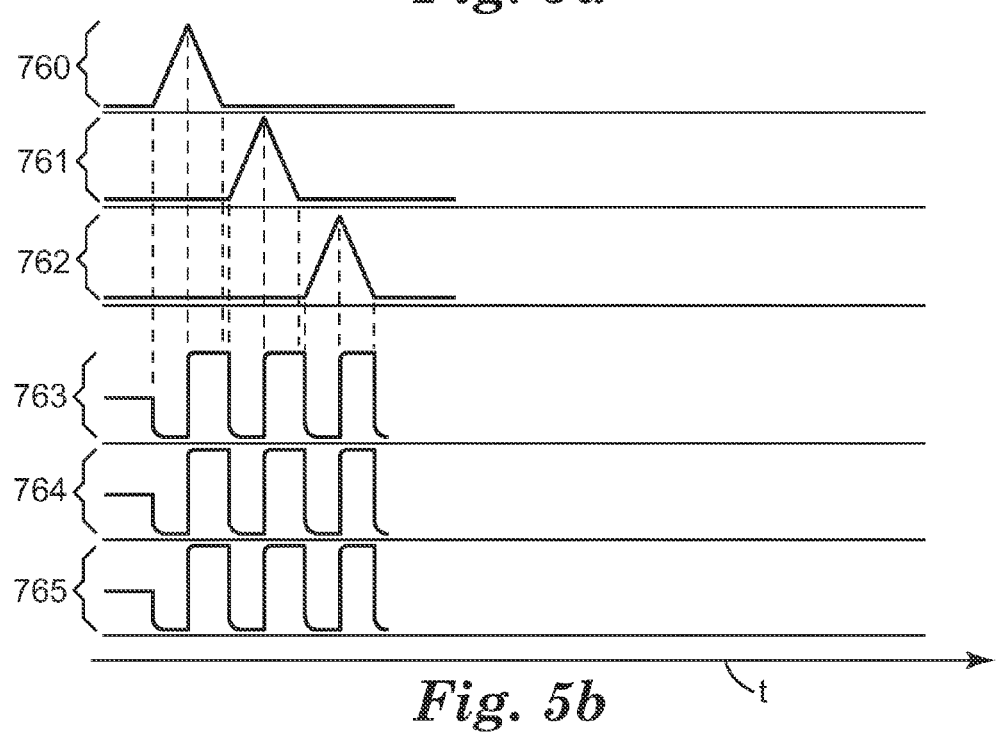
FIG. 5b is a graph showing modeled waveforms for three driven electrodes, and associated response waveforms on three receive electrodes, similar to FIG. 4b.

FIG. 5b depicts pairs of graphs showing representative waveforms from embodiments that include sequential driving of driven electrodes, similar to FIG. 4b, except using a different type of driven waveform. Waveforms 760, 761, and 762 are representative driven triangle pulse signals during a time period, t, on three separate (possibly adjacent one another) driven electrodes (a first, second, and third row on a matrix-type sensor, for example). Waveforms 763, 764, and 765 are respective resultant waveforms as would be seen on receive electrodes (for example, columns) during the same time period.

Figure 6A:
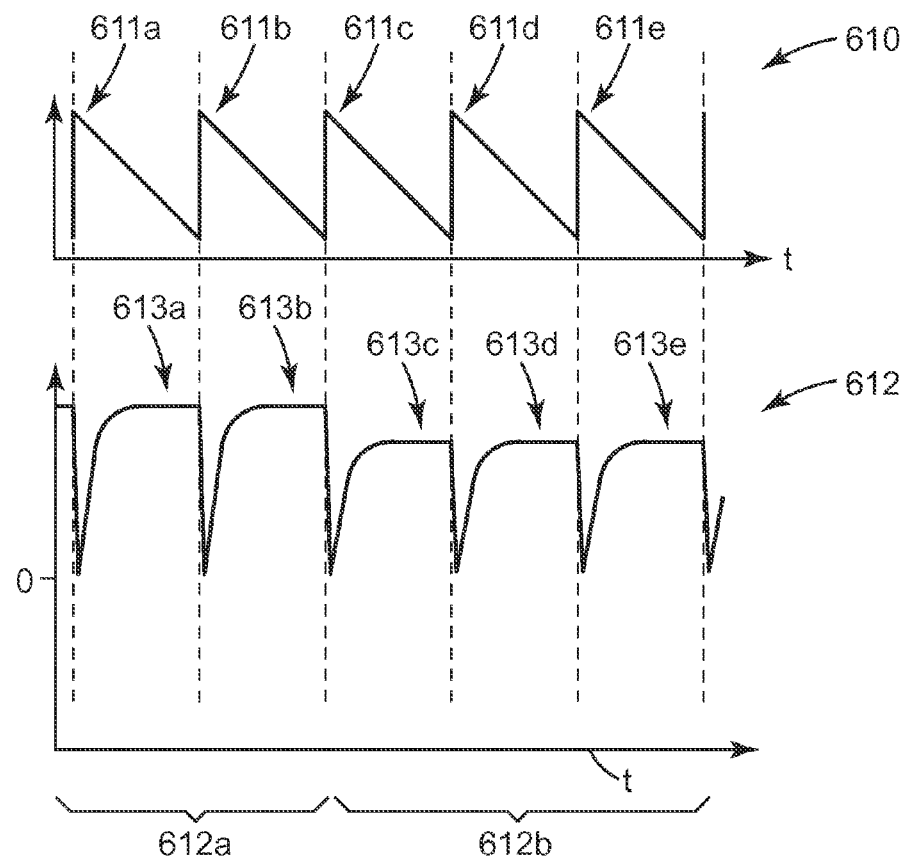
FIG. 6a is a graph of still another drive signal and a schematic depiction of an expected response signal for the touch device of FIG. 3a, the drive signal including ramped pulses and the response signal including rectangle pulses.

Turning now to FIG. 6a, the pair of graphs there are similar to those of FIGS. 5a and 4a, and assume the same electronic configuration of drive electrode, receive electrode, coupling capacitance, and sense unit, but a yet another drive signal shape is used. The drive signal 610 of FIG. 6b includes ramped pulses 611a-e, which yield the resultant response signal 612 having substantially rectangle pulses 613a-e. Unlike the symmetrical ramp shapes of FIG. 5a, ramped pulses 611a-e are asymmetrical so as to maximize the fraction of the pulse time used by the ramp. This ramp maximization, however, results in a rapid low-to-high transition on one side of each drive pulse, which produces a negative-going impulse pulse bounding each rectangle pulse of the response signal 612. In spite of the resulting deviations from perfect rectangularity, the pulses 613a-e are nevertheless substantially rectangular, insofar as they maintain a relatively constant amplitude plateau between two relatively steep high-to-low transitions. As such, and in a fashion analogous to signal 512 of FIG. 5a, the pulses of signal 612 include a steady-state characteristic as a consequence of the drive pulses having a constant slope over a substantial portion of the drive pulses, i.e., a ramped shape. The touch device designer may thus again wish to take advantage of this steady-state characteristic by eliminating the peak detector, sample/hold buffer, and reset circuit, provided the time scale of the steady-state characteristic is long enough for the ADC to sample and measure the amplitude. A low-pass filter may also be added to the circuit design as described above.

Figure 6B:
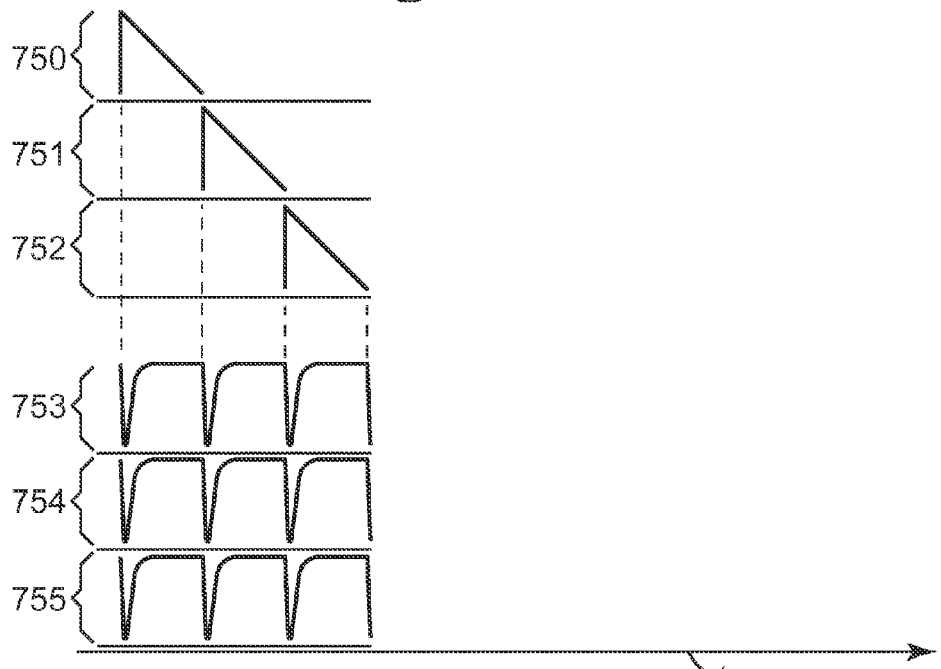
FIG. 6b is a graph showing modeled waveforms for three driven electrodes, and associated response waveforms on three receive electrodes, similar to FIGS. 4b and 5b.

FIG. 6b depicts a pair of graphs showing representative waveforms from embodiments that include sequential driving of driven electrodes, similar to FIG. 4b and FIG. 5b, except using a different type of driven waveform. Waveforms 750, 751, and 752 are representative driven ramped pulse signals during a time period, t, on three separate (possibly adjacent one another) driven electrodes (a first, second, and third row on a matrix-type sensor, for example). Waveforms 753, 754, and 755 (FIG. 7b) and 763, 764, and 765 (FIG. 7c) are respective resultant waveforms as would be seen on receive electrodes (for example, columns) during the same time period.

Figure 7:
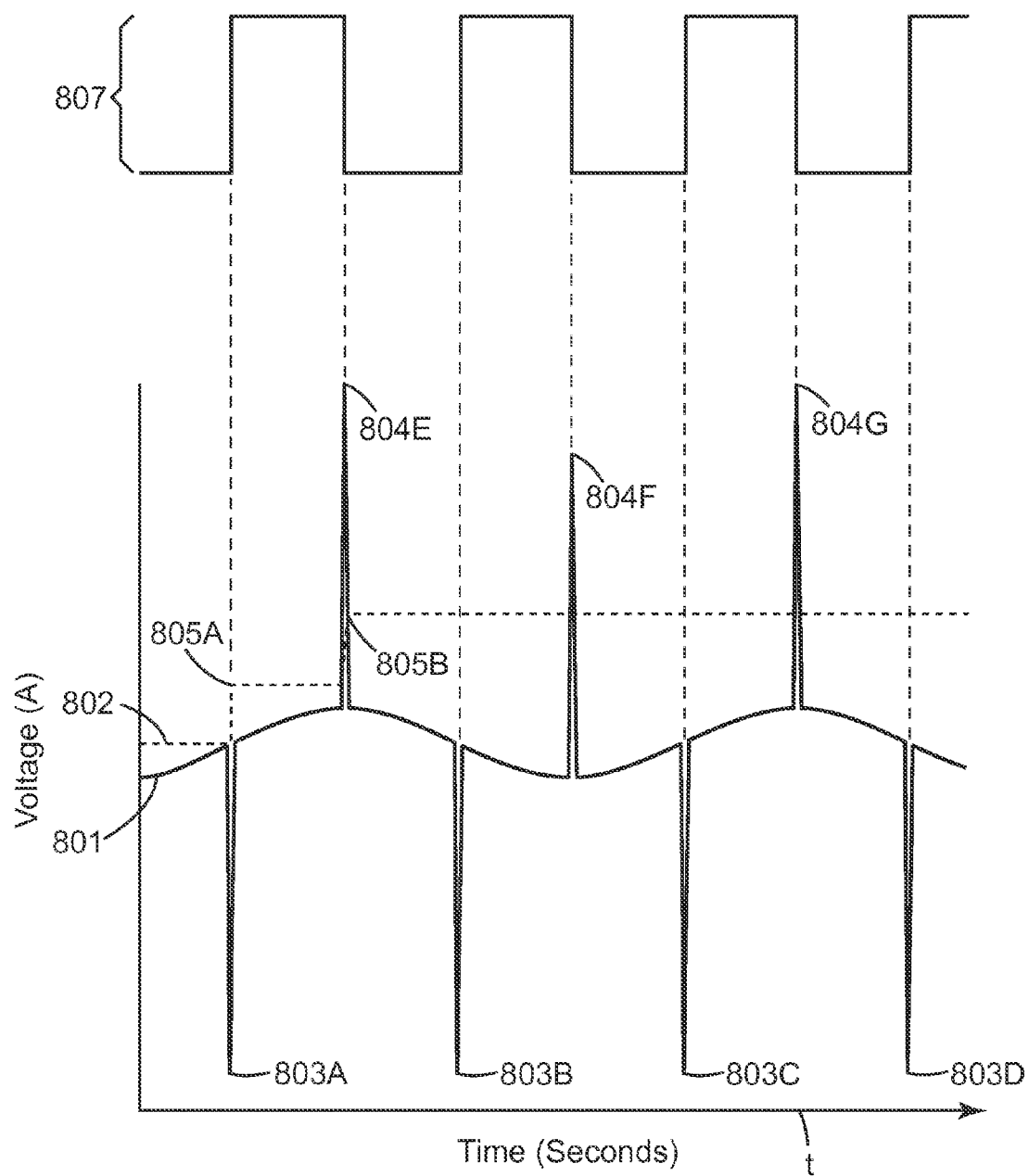
FIG. 7 is a graph of a drive signal and corresponding (modeled) response signal for the touch device of FIG. 3c, wherein the drive signal includes rectangle pulses and the response signal includes impulse pulses.

Turning now to FIG. 7, we see there a voltage vs. time graph of a pulsed drive signal 807 and a corresponding voltage vs. time graph of a (modeled) first response signal 801 and second response signal 802 as would be output generated by sense unit 322 and differential amplifier 352, respectively, of the circuit depicted in FIG. 3c. For purposes of the model, the electronic characteristics of the drive electrode, receive electrode, and coupling capacitance (including the effect of a touch thereon, i.e., decreasing the capacitance from 2.0 pf to 1.5 pf) were assumed to be as described above in connection with the representative embodiment of FIG. 3a.

First response signal 801 is the modeled output from sense unit 322. It includes a sinusoidal form indicative of a common mode signal similar to that which might be received as noise from an LCD panel. Response signal 802 is the respective modeled output from differential amplifier 352 (shown for the purposes of illustration as a short-dashed line; the actual output would be a solid line). The output from differential amplifier 352 is in effect the sum of the pulses (shown not to scale for illustrative purposes). The individual pulses on FIG. 7 (803a . . . d, 804e, f, g) have the same profile as pulses 413a . . . k in FIG. 4a, but they appear differently in FIG. 7 due to scaling. The first negative pulse (803a) is peak detected and summed on the inverting input of the amplifier giving the first step on response signal 802 (step 805a). The positive pulse (804e) is then peak detected and summed on the non-inverting input on the amplifier, giving the sum of both the positive and negative peaks at the output (step 805b). Neither succeeding pulses nor the common mode signal substantially effect the voltage level of response signal 802 after step 805b. A touch may be sensed by measuring a first voltage sample represented by waveform 802 after a series of pulses (that is, after the voltage has reached a plateau defined by step 805b), resetting peak detectors using reset circuits 353 and 326b (FIG. 3c), and then measuring a second voltage sample using the same or a similar process, and so forth. In certain embodiments, changes to these sample voltages, relative to some threshold, are indicative of a touch.

Figure 8:
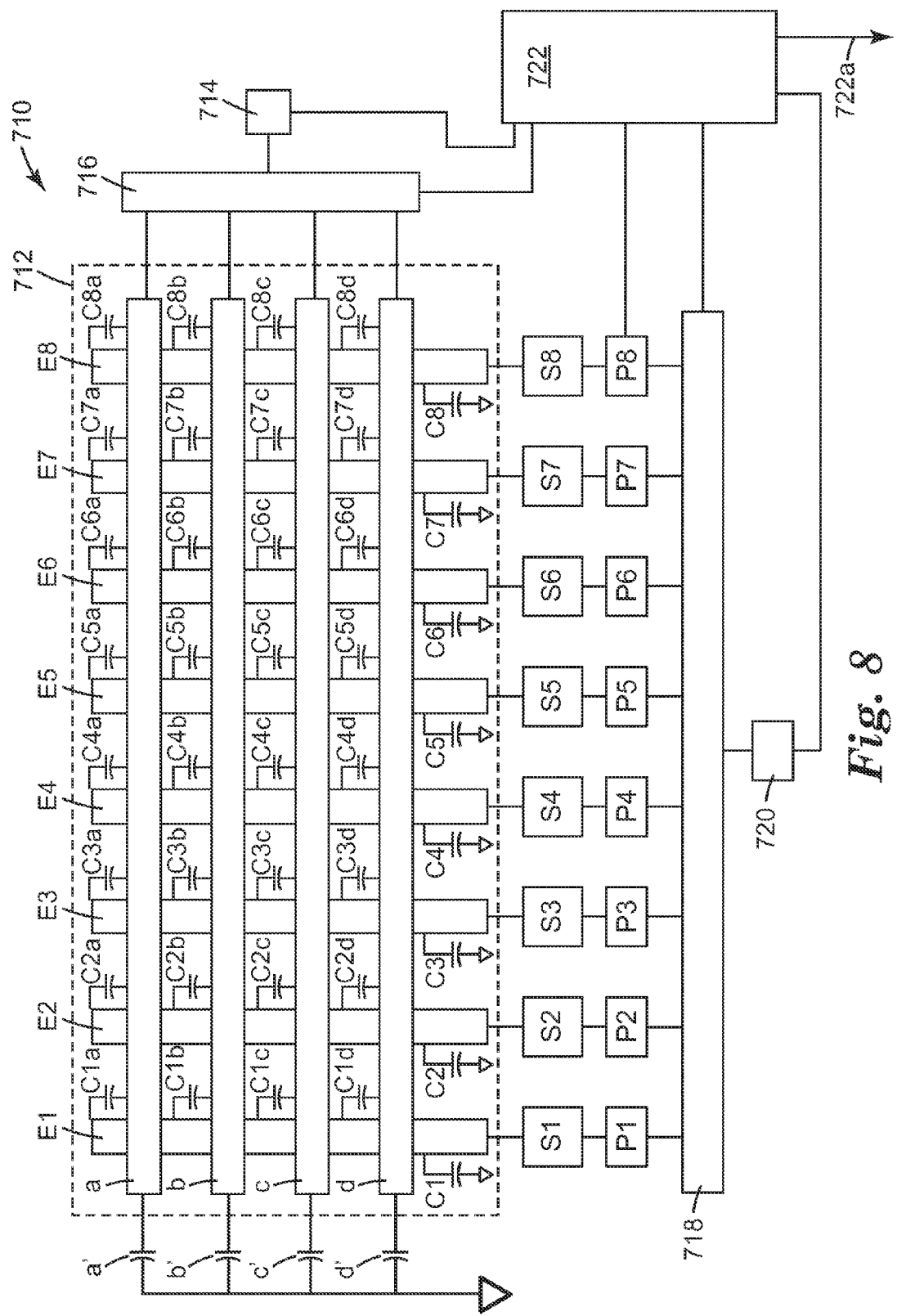
FIG. 8 is a schematic view of a touch device that includes a touch panel having a 4×8 matrix of capacitively coupled electrodes, and various circuit components that can be used to detect multiple simultaneous touches on the touch panel.

FIG. 8 is a schematic view of a touch device 710 that includes a touch panel 712 having a 4×8 matrix of capacitively coupled electrodes, and various circuit components that can be used to detect multiple simultaneous touches on the touch panel. The electrode matrix includes a top electrode array comprising parallel drive electrodes a, b, c, and d. Also included is a lower array comprising parallel receive electrodes E1, E2, E3, E4, E5, E6, E7, and E8. The top electrode array and the lower electrode array are arranged to be orthogonal to one another. The capacitive coupling between each pair of orthogonal electrodes, referred to above for a given node as the coupling capacitance $C_c$, is labeled for the various nodes of the matrix as C1a, C2a, C3a, C4a, C1b, C2b, and C3b, etc., through C8d as shown, the values of which may all be approximately equal in an untouched state but which decrease when a touch is applied as described previously. Also depicted in the figure is the capacitance between the various receive electrodes and ground (C1-C8) and between the various drive electrodes and ground (a' through d').

The 32 nodes of this matrix, i.e., the mutual capacitances or coupling capacitances associated therewith, are monitored by circuitry as described with respect to FIG. 3a: drive unit 714; multiplexer 716; sense units S1-S8; optional peak detectors P1-P8, which may also function as sample/hold buffers; multiplexer 718; as well as ADC 720; and controller 722, all connected as shown with suitable conductive traces or wires (except that connections between controller 722 and each of the peak detectors P1-P7 are omitted from the drawing for ease of illustration).

In operation, controller 722 causes drive unit 714 to generate a drive signal comprising one or more drive pulses, which are delivered to drive electrode a by operation of multiplexer 716. The drive signal couples to each of receive electrodes E1-E8 via their respective mutual capacitances with drive electrode a. The coupled signal causes the sense units S1-S8 to simultaneously, or substantially simultaneously, generate response signals for each of the receive electrodes. Thus, at this point in time in the operation of device 710, the drive signal being delivered to drive electrode a (which may include, for example, a maximum of 5, 4, 3, or 2 drive pulses, or may have only one drive pulse) is causing sense unit S1 to generate a response signal whose amplitude is indicative of coupling capacitance C1$a$ for the node E1/$a$, and sense unit S2 to generate a response signal whose amplitude is indicative of coupling capacitance C2$a$ for the node E2/$a$, etc., and so on for the other sense units S3-S8 corresponding to nodes E3/$a$ through E8/$a$, all at the same time. If the response signals are of a highly transient nature, e.g. as with signal 412 of FIG. 4$a$, then peak detectors P1-P8 may be provided to detect the peak amplitudes of the respective response signals provided by sense units S1-S8, and optionally to sample and hold those amplitudes at the outputs thereof which are provided to the multiplexer 718. Alternatively, if the response signals have a significant steady-state characteristic, e.g. if they are in the form of one or more rectangle pulses as with signals 512 and 612 described above, then the peak detectors may be replaced with low-pass filters, or the peak detectors may simply be omitted so that the outputs of the sense units feed directly into the multiplexer 718. In either case, while the characteristic amplitude signals (e.g. peak amplitude or average amplitude of the response signals) are being delivered to the multiplexer 718, the controller 722 rapidly cycles the multiplexer 718 so that the ADC 720 first couples to peak detector P1 (if present, or to a low-pass filter, or to S1, for example) to measure the characteristic amplitude associated with node E1/$a$, then couples to peak detector P2 to measure the characteristic amplitude associated with node E2/$a$, and so forth, lastly coupling to peak detector P8 to measure the characteristic amplitude associated with node E8/$a$. As these characteristic amplitudes are measured, the values are stored in the controller 722. If the peak detectors include sample/hold buffers, the controller resets them after the measurements are made.

In the next phase of operation, the controller 722 cycles the multiplexer 714 to couple the drive unit 714 to drive electrode b, and causes the drive unit to generate another drive signal that again comprises one or more drive pulses, now delivered to electrode b. The drive signal delivered to electrode b may be the same or different from that delivered previously to electrode a. For example, for reasons relating to touch panel losses explained above, the drive signal delivered to electrode b may have a smaller amplitude than that delivered to electrode a, due to electrode b's closer proximity to the ends of sense electrodes E1-E8 from which the response signals are derived (and thus lower losses). In any case, the drive signal delivered to electrode b causes sense unit S1 to generate a response signal whose amplitude is indicative of coupling capacitance C1$b$ for the node E1/$b$, and sense unit S2 to generate a response signal whose amplitude is indicative of coupling capacitance C2$b$ for the node E2/$b$, etc., and so on for the other sense units S3-S8 corresponding to nodes E3/$b$ through E8/$b$, all at the same time. The presence or absence of peak detectors P1-P8, or of sample/hold buffers, or of low-pass filters discussed above in connection with the first phase of operation is equally applicable here. In any case, while the characteristic amplitude signals (e.g. peak amplitude or average amplitude of the response signals) are being delivered to the multiplexer 718, the controller 722 rapidly cycles the multiplexer 718 so that the ADC 720 first couples to peak detector P1 (if present, or to a low-pass filter, or to S1, for example) to measure the characteristic amplitude associated with node E1/$b$, then couples to peak detector P2 to measure the characteristic amplitude associated with node E2/$b$, and so forth, lastly coupling to peak detector P8 to measure the characteristic amplitude associated with node E8/$b$. As these characteristic amplitudes are measured, the values are stored in the controller 722. If the peak detectors include sample/hold buffers, the controller resets them after the measurements are made.

Two more phases of operation then follow in similar fashion, wherein a drive signal is delivered to electrode c and the characteristic amplitudes associated with nodes E1/$c$ through E8/$c$, are measured and stored, and then a drive signal is delivered to electrode d and the characteristic amplitudes associated with nodes E1/$d$ through E8/$d$, are measured and stored.

At this point, characteristic amplitudes of all of the nodes of the touch matrix have been measured and stored within a very short timeframe, e.g., in some cases less than 20 msec or less than 10 msec, for example. The controller 722 may then compare these amplitudes with reference amplitudes for each of the nodes to obtain comparison values (e.g., difference values) for each node. If the reference amplitudes are representative of a non-touch condition, then a difference value of zero for a given node is indicative of "no touch" occurring at such node. On the other hand, a significant difference value is representative of a touch (which may include a partial touch) at the node. The controller 722 may employ interpolation techniques in the event that neighboring nodes exhibit significant difference values, as mentioned above.

Stylus Support

The embodiments described above support the resolution of multiple temporally overlapping touches, as with a finger or other pointing device that interferes with the coupling capacitance at a node in a touch panel. The electronics described above with respect particularly to FIGS. 3$a$ through 3$e$, or associated firmware, may be adapted, however, to support the resolution of stylus contact, or in some embodiments near contacts, made to the touch sensitive device (such as a touch panel). The remainder of this detailed description describes approaches to integrating stylus support to the earlier described electronics.

Any instrument that sufficiently interferes with the capacitive coupling at a node in the touch panel may be used as stylus with the above-described electronics. Some aftermarket products are currently available that provide, at the tip of a pen or pointing device, a conductive material that couples with transparent electrodes in a touch sensitive device in a manner not unlike that of a finger. These devices are generally passive devices, and may not have the resolution necessary to support, for example, high resolution signatures.

Figure 9:
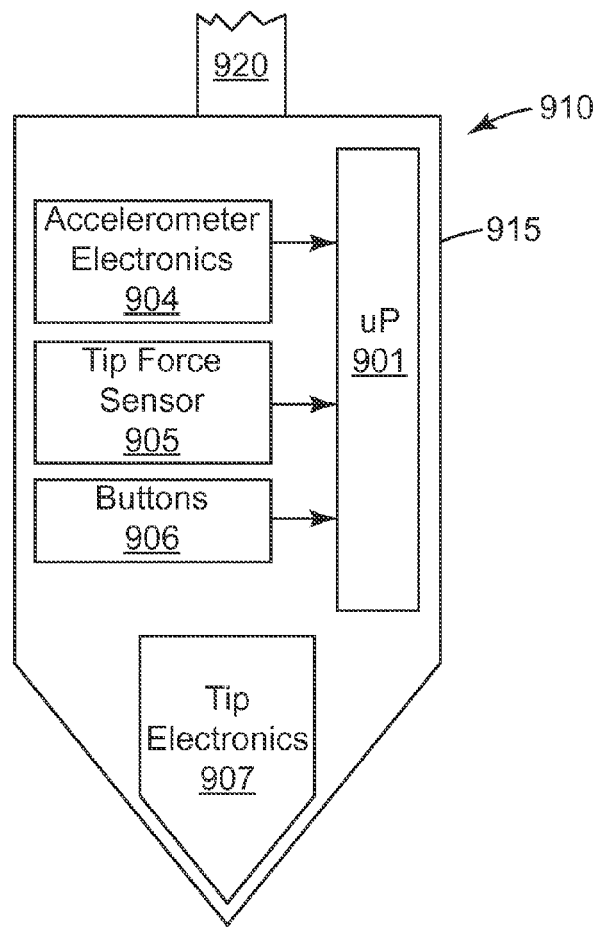
FIG. 9 is a schematic view of a stylus.

One embodiment of an active stylus is shown in FIG. 9. Stylus 910 includes a housing 915, which could be metal or plastic, designed to be comfortably held by a user, and shaped in one embodiment like a pen. One or more communication lines 920 tether the stylus to a host controller and are used for communication between the stylus microprocessor, as well as to provide power. Microprocessor 901 is programmed to communicate via communication lines 920 with a host controller, such as controller 114 (FIG. 1). Accelerometer 904 is shown communicatively coupled to microprocessor 901. Accelerometer 904 provides information about the orientation of the stylus relative to the touch panel, then the information used in conjunction with known interpolation techniques to provide increased accuracy of contact points. Tip force sensor 905 is shown communicatively coupled to microprocessor 901. Tip force sensor 905 provides information indicative of the pressure being applied to the tip of the stylus. Such a tip force sensor could be associated with turning the stylus on, putting the stylus into an active mode, or it could be used in applications where the pressure applied may be associated with particular modalities of input (for example, in writing the use of pressure may be reported to an application which then associates input with a bold typeface). Various buttons (906) may be employed to provide a user with various functionalities, such as turning the stylus on or off. Tip electronics 907, as further described with respect to the following three stylus embodiments, may include stylus drive electronics that provide a signal into the touch panel (and which would include a drive unit and a drive electrode), stylus receive electronics that receive a signal from the driven touch panel electrodes (and which would include stylus receive electronics and a receive electrode). In one embodiment described below, the stylus tip electronics 907 are configured to alternatively drive, and then receive, capacitively coupled signals on a common electrode (and thus would include both a stylus drive unit and stylus receive electronics). In some embodiments, particular elements shown within stylus housing 915 may be subsumed by functionality provided by a host controller. For example, the host controller 114 may be configured to interact with the various components described with respect to the stylus via communication lines 920, which could render microprocessor 901 unnecessary.

More specifically the microprocessor in one embodiment is based on a Cortex ARM microprocessor, the architecture for which is available from ARM, Inc. of San Jose, Calif., and the accelerometer is a three-axis sensitive device similar to units commercially available from Analog Devices of Boston, Mass., or ST Microelectronics of Geneva, Switzerland.

Stylus as Drive Electrode and Receive Electrode

In one embodiment the stylus may be integrated with the earlier-described multi-touch sensitive systems by configuring the stylus tip electronics 907 with both a stylus drive unit and stylus receive electronics. The stylus drive unit, which is similar to or the same as the drive unit or signal generator described earlier with respect to at least FIG. 1, is configured to generate a drive signal and deliver the drive signal to the stylus electrode. The stylus receive electronics may be configured similar to any of the embodiments shown with respect to FIGS. 3a through 3e, and may includes a stylus sense unit (similar in one embodiment to or the same as sense unit 322 in FIG. 3a). Depending on the implementation, stylus receive electronics may also include a stylus peak detection circuit (similar to or the same as peak detection circuit 326a in FIG. 3a).

Figure 10:
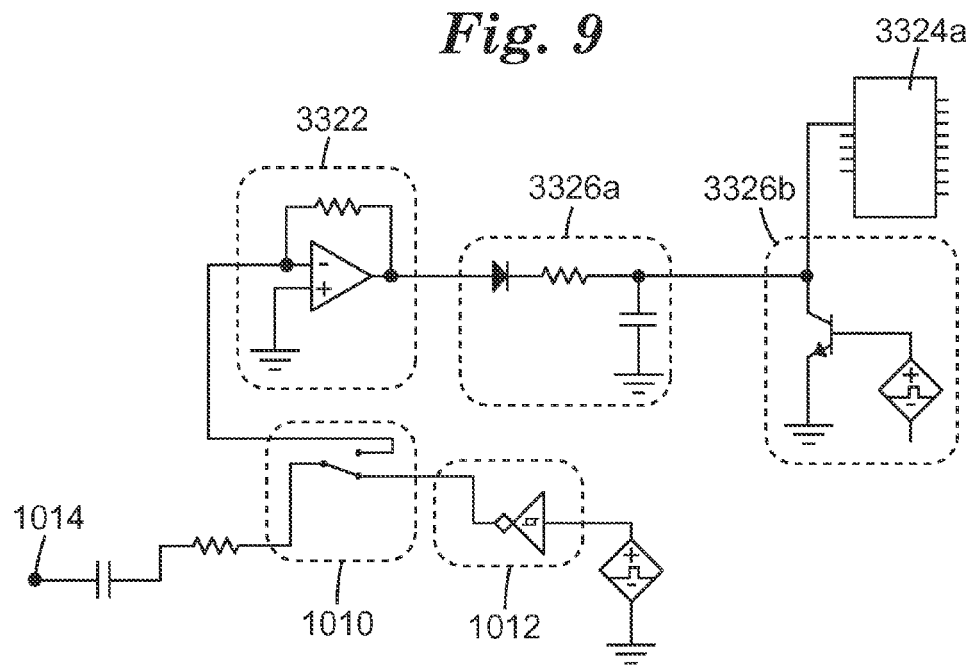
FIG. 10 is a schematic view of stylus electronics, including stylus receive electronics that are similar to those shown in FIG. 3a, and also including stylus drive electronics.

FIG. 10 depicts tip electronics 907 that include both a stylus drive unit and the stylus receive electronics. Pen tip 1014 is in one embodiment located proximate the part of the stylus designed to be in contact with or near contact with the touch pane, to be used for pointing. Pen tip 1014 includes the stylus electrode, which may be alternatively operated in driven or receive mode, depending on switch 1010, which may be controlled by microprocessor 901. When in stylus drive mode, stylus drive unit 1012 provides a stylus drive signal to the stylus electrode, which may comprise one or more square waves, triangle waves, ramped waves, or the like. If the stylus electrode is sufficiently close to the touch panel, as would be the case when a user is using the stylus to interact with the touch panel and the stylus is in contact with the touch panel, the stylus drive signal capacitively couples to a receive electrode in the touch panel 112. In this way, the stylus electrode, when in drive mode, acts in effect like an additional driven electrode of touch panel 112, and the firmware running on controller 114 is programmed to sequentially drive the drive rows, and then command the stylus drive unit to drive the stylus electrode. As described above with respect to embodiments shown in FIGS. 3a through 3e, for each drive sequence of a driven electrode (including the driven electrodes in touch pane 112 and the stylus electrode when in drive mode), the receive electrodes simultaneously receive. Controller 114 is thus programmed to accommodate a stylus drive cycle whereby, after touches to touch panel 112 have been resolved as described above, the stylus electrode is driven and the receive electrodes in touch panel 112 that are proximate the stylus electrode receive a signal that is the coupling capacitance ($C_c$) between the stylus drive electrode and the touch panel receive electrodes. Embodiments described above with respect to FIGS. 3a through 3e show various approaches to determining the relative $C_c$ of the receive electronics, each of which could be used, possibly in conjunction with known interpolation techniques, to reveal the position of the stylus on the receive electrode.

To resolve the location of the stylus tip relative to the other, yet unresolved axis, stylus tip electronics 907 is switched (via switch 1010) into stylus receive mode. The driven electrodes of touch panel 112 are sequentially driven, and a $C_c$ arises between particular driven electrodes and the stylus electrode, which is sensed by sense unit 3322 and peak detected via stylus peak detect unit 3326a, sampled via ADC 3324a, then reset via stylus reset circuit 3326b (all in a manner similar to the embodiment shown with respect to FIG. 3a). The stylus receive electronics, when in stylus receive mode, effectively act as an additional receive electrode, and controller 114 is programmed to query surrogates of $C_c$ for each of the receive electrodes as well as the stylus receive electrodes, after each drive sequence associated with a driven electrode. Thus the position of the stylus relative to the driven electrodes, using known interpolation techniques, may be determined. Coordinating the activities of the stylus drive and stylus receive modes is effected via the communication lines 920 by controller 114.

Figure 11A:
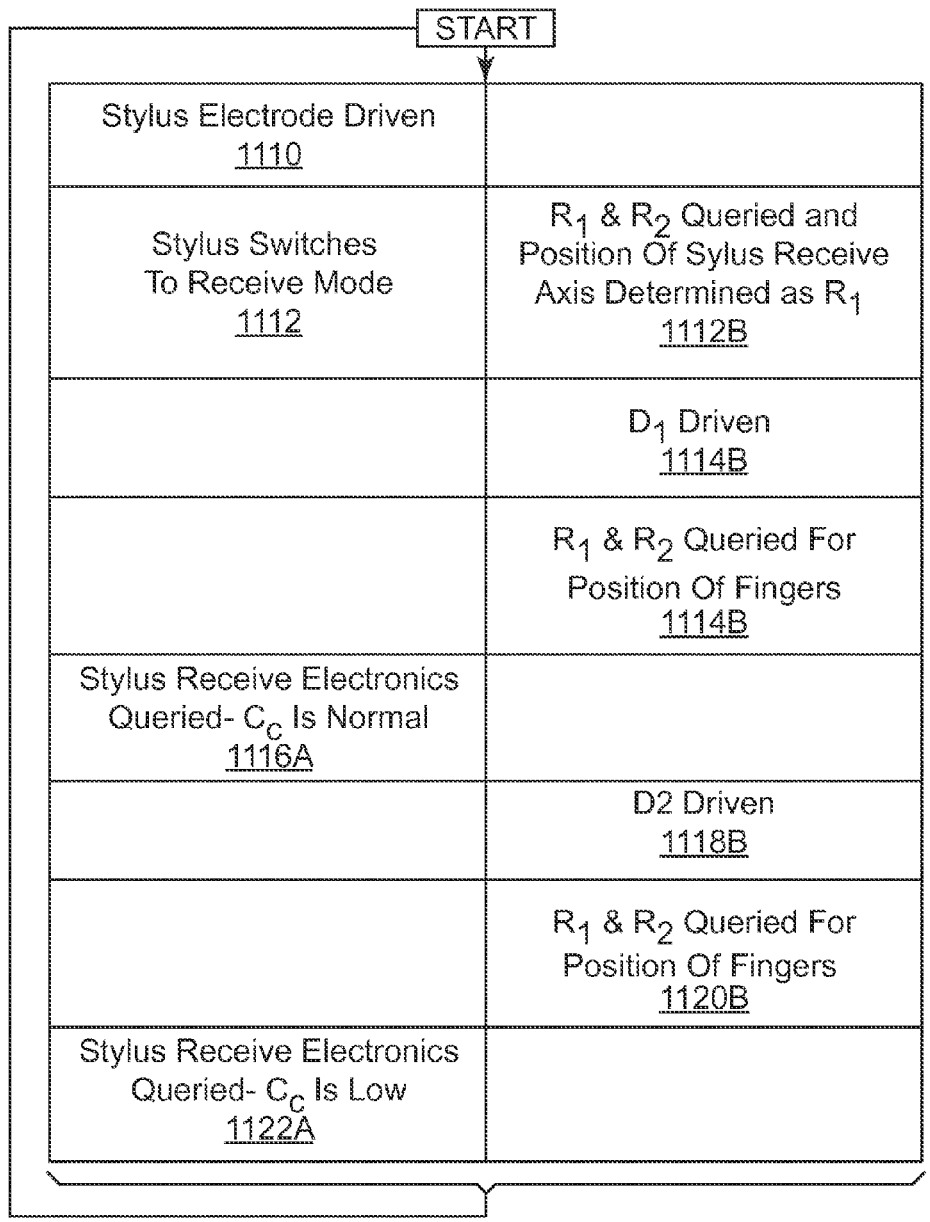
FIG. 11a is a flowchart illustrating a measurement sequence for a stylus that includes both stylus receive electronics and stylus drive electronics, and which receives signals emanating from the touch panel and provides signals to be received by the touch panel.
Figure 11B:
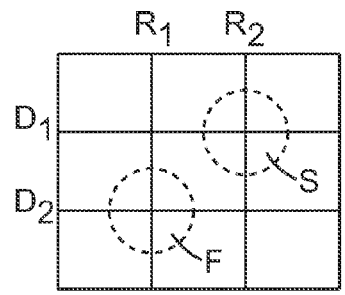
FIG. 11b is a schematic of a simplified mutual capacitive, matrix-type touch screen having two sets of electrodes, the first set being D1 and D2, and the second set being R1 and R2, and having present thereon a touch from a finger (F) and from a stylus (S)

FIG. 11a a swim lane flowchart illustrating the interaction and drive and receive modes of the stylus and touch panel implementing the embodiments and methods described with respect to FIG. 10 during a full measurement sequence (which includes driving all driven electrodes of touch panel 112 plus the stylus drive electrode). This example assumes each receive electrode is coupled to receive electronics as described with respect to FIG. 3a, though other receive electronics described with respect to other embodiments described with respect to FIG. 3b through 3e are contemplated. The left swim lane in FIG. 11a represents process steps in the stylus, and the right swim lane represents process steps in the touch panel. Certain coordinating and calculation activities of controller 114 are not shown in this figure and are described. FIG. 11b is a simplified touch panel that will be referred to in the sequence of FIG. 11a. FIG. 11b has two driven electrode (D1 and D2) and two receive electrodes (R1 and R2). Assume a stylus tip is at position S, and a finger is touching at position F.

The measurement sequence starts (1100) with the stylus in driven mode, and the stylus electrode driven (1110). As mentioned above, this could be with a series of square or ramped pulses, for example, the same or similar drive waveforms that are used to drive the driven electrodes of touch panel 112. Each wave will form a coupling capacitance $C_c$ on the receive electrode associated with R1, but not R2. Next, the stylus switches to receive mode (1112), and R1 and R2 are queried (1112B). The voltage in peak detect unit 326a (FIG. 3a) for R1 will be high, whereas the voltage in the peak detect unit for R2 will be low. Controller 114 may use this information to compute that the stylus tip is located proximate to the R1 electrode. Next, the driven electrodes in the touch panel are sequentially driven. This starts with applying one or more ramped or square wave pulses to D1, consistent with the description for embodiments described above with respect to FIGS. 3a through 3e. After D1 is driven, voltages associated peak amplitudes on each receive electrode (in this case R1 and R2) are queried by ADC unit 324 (referring once again to FIG. 3a) (step 1414B). A lower peak voltage would be seen on R2 than on R1, due to finger touch T reducing coupling capacitance $C_c$ at the D1-R2 node. Controller may compute the presence of a non-stylus touch at D1-R2. Next, the stylus receive electrode is queried (step 1116A) by inspecting the stylus peak detect unit 3326a. Since stylus electrode is positioned at position S in FIG. 11B, no (or relatively, very little) coupling capacitance $C_c$ is formed between the stylus electrode and the driven electrode D1 (that was driven in step 1114B), thus the associated amplitude of stylus sense unit would be low. Controller 114 may computer, based on this information, that there is no stylus at node D1-R1. Next, D2 is driven (1118B) in a manner similar to how D1 was driven in step 1114B. R1 and R2 are then queried (1120B) in a manner similar to step 1114B. Data from these two steps would allow controller 114 to compute that there exist no finger touches along the D2 electrode. Next, to complete the full measurement cycle, the stylus electrode is again queried in step 1122A (which is the same as step 1116A), but this time stylus peak detect unit 3326a would show a relatively higher voltage, which controller 114 would use to calculate that the stylus electrode is closest to the node D2-R1 node. The process then repeats.

This process may be adapted to accommodate multiple styli by controller 114 coordinating additional electrode drive steps (such as step 1110), in a manner further described later with respect to FIG. 12. The portion of the process wherein the stylus is acting as a receive electrode would not change, as each stylus would independently be able to couple to a driven electrode and have positional information related to one axis derived therefrom. That is, even supporting multiple styli, there would still only need to be one sequential driving of the driven electrodes in the touch panel, and resulting data from each stylus in contact with the touch panel could be used to determine the position of the respective stylus along the drive electrodes. Additional stylus drive sequences, however, would need to be added by controller 114 for each supported stylus. This could be accomplished by appropriately modifying the firmware of controller 114. As the driven electrodes of the touch panel are sequentially driven, each pen would receive a pulse that is temporally associated with a respective driven electrode thus defining one of the coordinates (X or Y, depending on how the system is oriented). After all of the driven electrodes have been driven, each pen, in sequence, would drive its respective stylus electrode while the receive electronics of the touch panel listens on each receive electrode. The receive electronics would be re-set, then the next pen pulses down, and so forth until all pens have pulsed downward. Each additional pen would require an additional drive cycle (for the pen) and corresponding receive cycle for the touch panel and its electronics.

This process represented in FIG. 11A may of course be modified in the spirit of this disclosure, the steps done in different orders, but the basic process is presented herein, and such modifications are intended to be within the scope of this disclosure. Controller 114's calculation of the precise location of stylus touch point S and finger touch point F (FIG. 11B) could be enhanced using known interpolation techniques, given the coupling capacitances at proximate nodes, or using data from for example accelerometer 904 (which could be used to determine the angle of the stylus tip).

Stylus as Drive Electrode Only

In another embodiment, the stylus may be integrated with the above-described multi-touch sensitive systems by configuring the stylus tip electronics 907 with a stylus drive unit. The stylus drive unit would be the same or similar to that described with respect to the embodiment shown with respect to FIG. 10, and would be configured in the same or a way similar to described in regards to that embodiment. The stylus in such an embodiment would not include the stylus receive electronics.

In such an embodiment, the electronics associated with the touch panel would need to be modified to, in one embodiment, essentially let the driven electrodes be switched to act either as driven electrodes or as another set of receive electrodes. For example, referring to the simple touch panel representation of FIG. 11b, each receive electrode is coupled to receive electronics, several embodiments of which are described above with respect to FIGS. 3a through 3e. After each drive electrode (D1, then D2) is driven, receive electronics associated with each receive electrode are queried, and resultant touch information derived. To accommodate a stylus that acts as a drive electrode, its position with respect to the receive electrodes (R1 and R2) may be determined in the same or similar manner as described above with respect to "Stylus as Drive Electrode and Receive Electrode." However, in order to determine the position of the stylus electrode relative to the driven electrodes (D1 and D2), in this embodiment the drive electrodes are switched to the receive electronics associated with R1 and R2, which "listen" when as the stylus electrode is driven. The receive electronics, now associated with D1 and D2, may then be queried to determine the position of the stylus electrode relative to D1 and D2.

The coupling of the driven electrodes to receive electronics may be accomplished in several ways. As described above, there may be a switch employed such that the same receive electronics that serve the receive electrodes may be utilized to "listen" on the drive electrodes. Alternatively, or additionally, a portion or all of the drive electrodes may have their own dedicated receive electronics.

Figure 12:
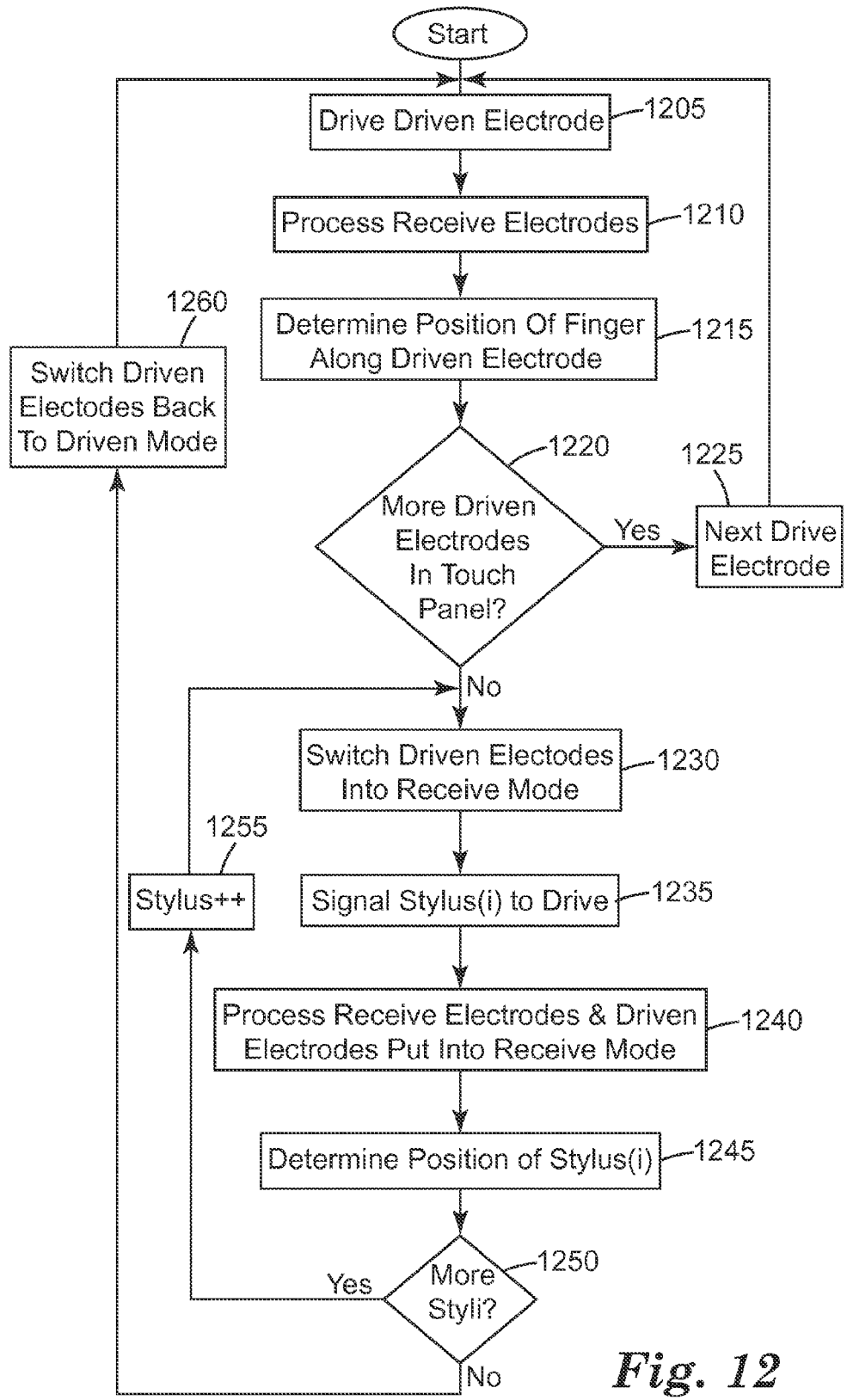
FIG. 12 is a flowchart illustrating a measurement sequence for a stylus that is configured to provide signals from the stylus to the touch panel, and the stylus touch panel is configured to receive said signals and determine therefrom the position of the stylus on the touch panel.

FIG. 12 is a flowchart illustrating a representative drive cycle of an embodiment where the stylus acts as a drive electrode only, in combination with a touch panel as described above. Reference is made to the simplified rendering of a touch panel in FIG. 11b. An initial drive electrode (D1) is driven (step 1205). The receive electrodes are then processed (step 1210), in a manner consistent with any of the embodiment described above with respect to FIG. 3a through 3e, which yields data indicative of touches along the D1 drive electrode (step 1215). In the case of the touch panel shown with respect to FIG. 11B, the electronics associated with receive electrode R2 would show a surrogate (such as voltage, in the case of the embodiments shown in FIG. 3a) of coupling capacitance at node D1-R2 that is lower than other nodes along D1, indicating a touch at position F. If there are more drive electrodes in the touch panel (yes at step 1220), the process moves on to the next drive electrode D2 (step 1225) and the process repeats until all driven electrodes in the touch panel have been driven (no at step 1220), and receive electronics subsequently processed, yielding position information. This process yields information indicative of the coordinates of all conventional touches to the touch screen, be it one or many simultaneous or temporally overlapping finger touches.

With all touch panel drive electrodes sequentially driven and all touches to the touch panel resolved, controller 114 proceeds to stylus support mode (no at step 1220) to resolve the coordinates of one or many styli in proximity to the touch panel. The driven electrodes (D1 and D2) are switched by controller 114 to be coupled to receive electronics (step 1230) of the type used with R1 and R2, or possibly any type as described with respect to FIGS. 3a through 3e. Effectively, D1 and D2 become additional receive electrodes similar to R1 and R2. Controller 114 then signals the first stylus to drive its stylus electrode (step 1235). The receive electrodes R1 and R2 would then be processed as described above, and the driven electrodes D1 and D2 that were put into receive mode would also be similarly processed (step 1240). This processing would sense a higher coupling capacitance to form along node R1, and also to form a long D2, indicating a stylus electrode in proximity to node D2-R1 (step 1245). If there are more styli (yes at step 1250), the next stylus (step 1255) is selected by controller 114, and the process repeats until all styli known by controller 114 have been driven (no at 1250). Then the driven electrodes are de-coupled from the receive electronics, or otherwise put back into their native drive mode (step 1260) and the entire process repeats.

This process assumes separate, non-shared receive electronics may be coupled to the drive electrodes D1 and D2, which allows for each stylus to be driven only once. In such a configuration (or any configuration discussed herein), the stylus may in fact be configured to drive multiple times to improve signal to noise ratios. In another embodiment, however, the receive electronics are shared between the receive electrodes and the drive electrodes. In such an embodiment, the location of the stylus along the receive access (R1 and R2) is developed by a first signal provided by the stylus, then the driven electrodes D1 and D2 are coupled to the receive electronics associated with R1 and R2, to receive a subsequent signal from the stylus and thus develop the location of the stylus along the driven electrode axis (D1 and D2). This approach has the benefit of reducing the receive electronics, but adds an additional drive step for each stylus.

Multiple styli are supported by programming the controller's firmware to coordinate sequential pulsing of each pen, corresponding to a receive sequence for each axis of the touch panel. For example, a first stylus electrode would be driven, and the receive electronics associated with one of the touch panel's axis would be evaluated, then the first stylus electrode would again be driven, and receive electronics associated with the other one of the touch panel's axis would be evaluated. Then the process would repeat for all successive supported styli, with appropriate re-setting of the receive electronics as necessary. In some embodiments, for example where the receive electronics associated with respective X- or Y-electrode sets are not shared, a single drive sequence provided to the stylus electrode may provide both the X- and the Y-coordinate.

Stylus as Receive Electrode Only

In another embodiment, the stylus may be integrated with above-described multi-touch sensitive systems by configuring the stylus tip electronics 907 with stylus receive electronics. The stylus receive electronics would be the same or similar to the receive portion of the electronics described with respect to the embodiment shown with respect to FIG. 10, and would be configured in the same or a similar manner as described with respect to that embodiment. The stylus in such an embodiment would not need to include the stylus drive electronics.

In such an embodiment, the electronics associated with the touch panel would need to be modified to, in one embodiment, essentially allow the receive electrodes to be sequentially driven, the same or similar to the manner in which the drive electrodes are sequentially driven. For example, referring to the simple touch panel representation of FIG. 11b, each drive electrode D1 and D2 would be coupled to a drive unit (likely with a multiplexer in between). The receive electrodes R1 and R2 are coupled to receive electrodes, several embodiments of which are described with respect to FIGS. 3a through 3e. After each drive electrode is driven, the coupling capacitances formed on each the receive electrodes is processed by controller 114, the receive electronics reset, and the next drive electrode driven, etc, until all drive electrodes have been driven. This process is the same as what has been described above with respect to multi-touch system operation with respect to FIGS. 3a through 3e. The stylus electrode, if proximate to driven electrodes in the touch panel, will couple to particular drive electrodes to which the stylus electrode is proximately located. The stylus microprocessor 901 may send data indicative of a coupling capacitance between the stylus electrode and a particular one of the touch panel drive electrodes after each touch panel drive electrode drive sequence, such that controller 114 may compute where the stylus electrode is located (and again may further employ known interpolation techniques for higher precision). In another embodiment, the controller 114 signals to microprocessor 901 when an entire drive cycle (including all driven electrodes) is beginning (t=0), then the microprocessor 901 would report back the time offset value (t+x) when a coupling capacitance value above some threshold was measured using the stylus receive electronics in tip electronics 907. After the all driven electrodes are driven in sequence, the time offset values of all capacitances above a threshold (as well as data indicative of such capacitances) may be provided to controller 114 by microprocessor 901, which controller 114 may then use to determine which driven electrodes the offsets are associated with. Once all driven electrodes of the touch panel have been so driven, the receive electrodes of the touch panel are sequentially driven, in one embodiment through the use of a multiplexer coupled between the drive unit and each receive electrode. The touch panel receive electrodes then are sequentially driven, and a coupling capacitance formed with the stylus electrode, and reported back to controller 114 similar to the manner in which the stylus electrode position relative to the driven electrodes was determined.

After a full drive cycle (comprising sequentially driving the touch panel drive electrodes and then sequentially driving the touch panel receive electrodes), controller 114 may determine the coordinates of the stylus electrode relative to the touch panel's receive and drive electrodes.

Note that in the embodiment just described, the same sequence determines the positions of any traditional touches (as with a finger) as well as the location of the stylus with respect to the touch panel's driven electrodes. In some embodiments, the coupling capacitance that is formed with the stylus electrode may negatively impact a finger located proximate to the same driven electrode, because the coupling of the stylus may introduce artifacts into the signal used for detecting finger touches. In another embodiment, this is addressed by having a dedicated finger drive sequence (where the stylus is not "listening") as described with respect to any of the embodiments associated with FIGS. 3a through 3e, then driving the touch panel driven electrodes again (where the stylus is listening, but the touch panel's receive electronics are possibly not queried and reset after each drive sequence, which would mean the drive sequence could be faster), and then a third drive sequence wherein the touch panel receive electronics are sequentially driven while the stylus is again in listening mode.

Figure 13:
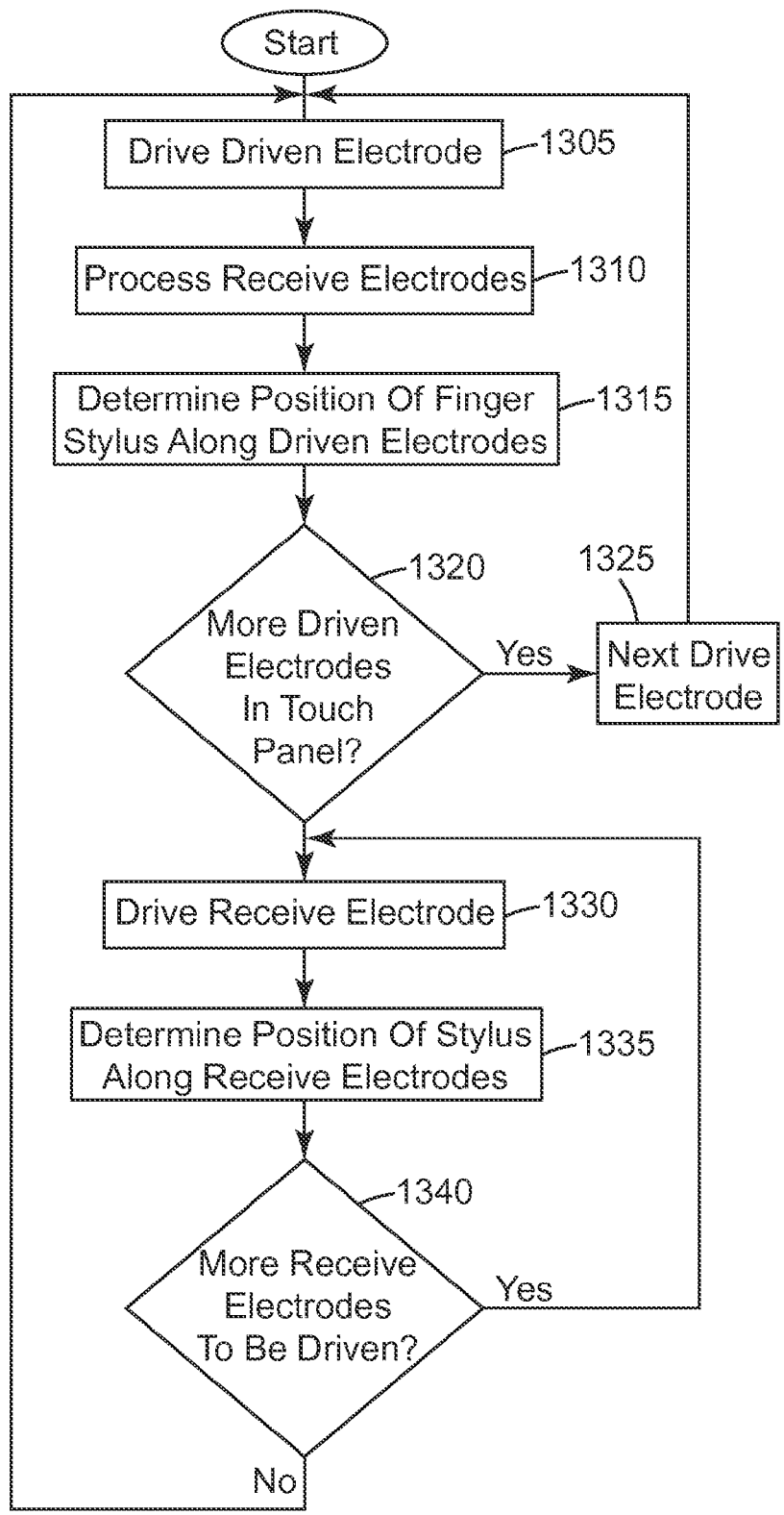
FIG. 13 is a flowchart illustrating a measurement sequence for a stylus that is configured to receive signals emanating from a touch panel, and the touch panel is configured to provide signals, and a controller is configured to determine the position of the stylus based on the received signals.

FIG. 13 is a flowchart illustrating a representative drive cycle of an embodiment where the stylus acts as a receive electrode only (as opposed to earlier described embodiments in which the stylus acted as both a receive and drive electrode, or just a drive electrode), in combination with a touch panel as described above. Reference is made to the simplified rendering of a touch panel in FIG. 11b. An initial drive electrode (D1) is driven (step 1305). The receive electrodes are then processed (step 1310), in a manner consistent with any of the embodiments described above with respect to FIG. 3a through 3e, which yields data indicative of touches along the D1 drive electrode (step 1315). In the case of the touch panel shown with respect to FIG. 11B, the electronics associated with receive electrode R2 would show a surrogate (such as voltage, in the case of the embodiment shown in FIG. 3a) of coupling capacitance at node D1-R2 that is lower than other nodes along D1, indicating a touch at position F. The stylus receive electronics are also processed (also in steps 1315), because if the stylus electrode is sufficiently close to D1, a coupling capacitance would form and be sensed by stylus microprocessor 901 in combination with the stylus receive electronics. In the case of the driving of D1, no coupling capacitance above a threshold value is formed with the stylus electrode because the stylus electrode is too far away from D1. If there are more drive electrodes in the touch panel (yes at step 1320), the process moves on to the next drive electrode D2 (step 1325) and the process repeats until all driven electrodes in the touch panel have been driven (no at step 1320), yielding touch-related information, as described in detail earlier in this description. When electrode D2 is driven, a coupling capacitance between electrode D2 and the stylus electrode is formed due to the stylus electrode being at position S, and this is sensed by the stylus receive electronics, and reported by microprocessor 901 to controller 114 either via radio 903 or via some other connection, such as universal serial bus or other wired connection. With this information, controller 114 has information only sufficient to infer that a stylus is located somewhere along D2, but does not know if that somewhere is closer to receive electrode R1 or R2. Thus, before proceeding to the remainder of the process (no at 1320), controller 114 has enough data to determine the position of all finger touches (or anything that would reduce coupling capacitance at a node), and partial data as to the position of the stylus.

The remainder of the process shown in FIG. 13 concerns developing the additionally needed information concerning the location of stylus electrode along receive electrode R1 and R2. This information is developed by sequentially driving the touch panel's receive electrode R1 and R2 in a manner similar to or the same as D1 and D2 were driven. Thus, controller 114 provides signals that turn first R1 into a drive electrode by coupling electrode R1 with a drive unit. In one embodiment the drive unit is the same as that which is used to drive touch panel driven electrodes D1 and D2, and the connection occurs via a switch or a multiplexer. When R1 is driven (step 1330), a coupling capacitance is formed on the stylus electrode that is located at position S. This information will be reported back to controller 114 by microprocessor 901 in ways earlier described, which will reveal that the stylus electrode is at position S (step 1335). The process continues for each touch panel receive electrode (decision at 1340) until all touch panel receive electrodes have been driven, at which point the process repeats (no at 1340).

Multiple styli may be supported without modifying the basic drive routine. Each stylus would signal when it had coupled with signal emanating from the sensor, and controller 114 would associate coupling with the electrode previously driven, and thereby establish coordinate type information for one stylus or a plurality of styli.

With regard to all of the stylus-related embodiments described herein, they have generally been described with respect to a peak-detect type circuit. In other embodiments, the same concepts may be used with other, more traditional circuits, including those that integrate (rather than peak detect) the received signal, and in such way determine a coupling capacitance between two electrodes.

Further, embodiments have been described having various electronic components within the stylus housing. It is to be understood that the stylus electrode is the only thing needing to be in the stylus housing; remaining components may be all physically arranged outside of the stylus housing.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

What is claimed:

1. A touch sensitive system comprising:
  a touch panel comprising transparent capacitive sensing medium including a plurality of drive electrodes and a plurality of receive electrodes arranged to form a matrix and an insulating layer arranged between the plurality of drive electrodes and the plurality of receive electrodes, the matrix having a plurality of nodes defined by areas where the drive electrodes and the receive electrodes traverse one another;
  a stylus drive unit configured to provide a stylus drive signal to a stylus electrode;
  a stylus sense unit configured to generate stylus response signals from the stylus electrode, the stylus response signal comprising a differentiated representation of a sensing medium drive signal, the amplitude of the differentiated representation being responsive to the coupling capacitance between the stylus electrode and one of the plurality of drive electrodes, the stylus sense unit comprising receive electronics that are capable of resolving the location of a stylus tip relative to an unresolved axis;

a touch panel drive unit configured to generate a touch panel drive signal and deliver the touch panel drive signal to the drive electrodes in the touch panel one at a time;

a touch panel sense unit configured to generate, for each stylus drive signal delivered to the stylus electrode, touch panel response signals for the plurality of receive electrodes in the touch panel, an amplitude of each of the response signals being responsive to the coupling capacitance at the associated receive electrode in the touch panel;

a measurement unit configured to measure or receive input indicative of each of the amplitude of the stylus response signals and the amplitude of the touch panel response signals and to determine therefrom the position of the stylus electrode, if present, on the touch surfaces, wherein the touch sensitive system is configured to be switchable between distinct stylus receive and stylus drive modes, the operation of the stylus drive unit being associated with the stylus drive mode, and the operation of the stylus sense unit being associated with the stylus receive mode.

2. The touch sensitive system of claim 1, further comprising a signal generator coupled to the stylus drive unit and the touch panel drive unit.

3. The touch sensitive system of claim 1, wherein the operation of the touch panel drive unit is associated with a touch panel drive mode, and the operation of the touch panel sense unit is associated with a touch panel receive mode.

4. The touch sensitive system of claim 3, further comprising:
control logic configured to coordinate activation and deactivation of the stylus drive mode, the stylus receive mode, the touch panel drive mode, and the touch panel receive mode.

5. The touch sensitive system of claim 4, wherein the control logic is configured to temporally overlap activation of the stylus drive mode and the touch panel receive mode, then to temporally overlap activation of the touch panel drive mode and the stylus receive mode.

6. The touch sensitive system of claim 5, wherein the control logic is further configured such the touch panel drive mode and the stylus receive mode are deactivated before the activation of the stylus drive mode and the touch panel receive mode, and vice versa.

7. The touch sensitive system of claim 1, further comprising a stylus housing mechanically coupled to the stylus electrode.

8. The touch sensitive system of claim 7, wherein the stylus housing is additionally mechanically coupled to the stylus drive unit and the stylus sense unit.

9. The touch sensitive system of claim 8, wherein the housing is plastic.

10. The touch sensitive system of claim 7, further comprising:
a stylus processor unit communicatively coupled to the stylus sense unit and mechanically coupled to the stylus housing.

11. The touch sensitive system of claim 10, wherein the stylus processor unit is communicatively coupled to the touch panel drive unit, and wherein the stylus processor is communicatively coupled to the measurement unit, and the stylus processor is programmed to provide information indicative of the degree of capacitive coupling between they stylus electrode and a touch panel electrode.

12. The touch sensitive system of claim 11, wherein the stylus processor unit is communicatively coupled to the measurement unit by a plurality of wires.

13. The touch sensitive system of claim 1, wherein the stylus sense unit includes an operational amplifier having an inverting input coupled to the stylus electrode.

14. The touch sensitive system of claim 1, wherein the drive signal comprises a rectangle pulse.

15. The touch sensitive system of claim 1, wherein the stylus sense unit includes a stylus peak detector configured to provide a peak detector output representative of a maximum amplitude of the respective stylus response signal.

16. The touch sensitive system of claim 15, wherein the stylus peak detector comprises a diode coupled to a capacitor.

17. The touch sensitive system of claim 15, wherein the stylus peak detector comprises a sample/hold buffer.

18. The touch sensitive system of claim 14, wherein the measurement unit is configured to measure for each response signal or stylus response signal a maximum one of the amplitudes of the plurality of response pulses.

19. A touch sensitive system comprising:
a touch panel comprising capacitive sensing medium including a matrix of drive electrodes and receive electrodes, the matrix having a plurality of nodes defined by areas where the drive electrodes and the receive electrodes traverse one another;

a stylus drive unit configured to provide a stylus drive signal to at least one of the receive electrodes from a stylus;

a stylus sense unit configured to measure stylus response signals received by the stylus from at least one of the drive electrodes, the amplitude of the stylus response signals being responsive to the coupling capacitance between the stylus and one of the plurality of drive electrodes;

a touch panel drive unit configured to generate a touch panel drive signal and deliver the touch panel drive signal to the drive electrodes in the touch panel and to the stylus;

a touch panel sense unit configured to generate, for each stylus drive signal delivered from the stylus, response signals on at least one of the plurality of receive electrodes in the touch panel, an amplitude of each of the response signals being responsive to the coupling capacitance between the stylus and the associated receive electrode in the touch panel;

a measurement unit configured to measure or receive input indicative of each of the amplitude of the stylus response signals and the amplitude of the touch panel response signals and to determine therefrom the position of the stylus, if present, on the touch surfaces, wherein the touch sensitive system is configured to be switchable between distinct stylus receive and stylus drive modes, the operation of the stylus drive unit being associated with the stylus drive mode, and the operation of the stylus sense unit being associated with the stylus receive mode.

* * * * *

UNITED STATES PATENT AND TRADEMARK OFFICE
CERTIFICATE OF CORRECTION

| | | |
|---|---|---|
| PATENT NO. | : 10,019,119 B2 | Page 1 of 1 |
| APPLICATION NO. | : 12/878612 | |
| DATED | : July 10, 2018 | |
| INVENTOR(S) | : Rebeschi et al. | |

It is certified that error appears in the above-identified patent and that said Letters Patent is hereby corrected as shown below:

In the Drawings

<u>Sheet 14 of 16, Reference Numeral 1112B in Fig. 11A</u>
Line 2; Delete "Sylus" and insert -- Stylus --, therefor.

In the Specification

<u>Column 2</u>
Line 32; Delete "a the" and insert -- the --, therefor.

In the Claims

<u>Column 27</u>
Line 24; In Claim 1, delete "surfaces," and insert -- surface, --, therefor.

<u>Column 27</u>
Line 49; In Claim 6, after "such" insert -- that --, therefor.

<u>Column 28</u>
Line 6; In Claim 11, delete "they" and insert -- the --, therefor.

<u>Column 28</u>
Line 59; In Claim 19, delete "surfaces," and insert -- surface, --, therefor.

Signed and Sealed this
Twelfth Day of March, 2019

Andrei Iancu
*Director of the United States Patent and Trademark Office*